US010272725B2

(12) United States Patent
Takagi et al.

(10) Patent No.: US 10,272,725 B2
(45) Date of Patent: Apr. 30, 2019

(54) PNEUMATIC TIRE

(71) Applicant: SUMITOMO RUBBER INDUSTRIES, LTD., Kobe-shi, Hyogo (JP)

(72) Inventors: Keiji Takagi, Kobe (JP); Yoshiaki Kanematsu, Kobe (JP); Hiroshi Yamaoka, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 197 days.

(21) Appl. No.: 15/100,568

(22) PCT Filed: Nov. 25, 2014

(86) PCT No.: PCT/JP2014/081094
§ 371 (c)(1),
(2) Date: May 31, 2016

(87) PCT Pub. No.: WO2015/093238
PCT Pub. Date: Jun. 25, 2015

(65) Prior Publication Data
US 2016/0297251 A1    Oct. 13, 2016

(30) Foreign Application Priority Data

Dec. 20, 2013 (JP) .................................. 2013-264234
Jan. 20, 2014 (JP) .................................. 2014-007956
Feb. 28, 2014 (JP) .................................. 2014-039103

(51) Int. Cl.
*B60C 11/03* (2006.01)
*B60C 11/12* (2006.01)

(52) U.S. Cl.
CPC ...... *B60C 11/0332* (2013.01); *B60C 11/0302* (2013.01); *B60C 11/0304* (2013.01);
(Continued)

(58) Field of Classification Search
CPC ............. B60C 11/0302; B60C 11/0304; B60C 11/0306; B60C 11/0332; B60C 11/1236;
(Continued)

(56) References Cited

U.S. PATENT DOCUMENTS 6,341,633 B1    1/2002  Adlon et al.
2009/0188595 A1  7/2009  Kishizoe
(Continued)

FOREIGN PATENT DOCUMENTS

DE    102007044435 A1  *  3/2009  ......... B60C 11/0302
JP    H05178015 A  *  7/1993
(Continued)

OTHER PUBLICATIONS

DE102007044435A1—Machine Translation (Year: 2009).*
(Continued)

*Primary Examiner* — Matthew J Daniels
*Assistant Examiner* — Yunju Kim
(74) *Attorney, Agent, or Firm* — Birch, Stewart, Kolasch & Birch, LLP

(57) ABSTRACT

Performance on snowy roads is improved. Provided is a pneumatic tire, of which the mounting orientation on a vehicle is indicated. An outer middle land part is formed between a first major groove and a second major groove. The first major groove has first portions and second portions alternately formed in the tire circumferential direction, the second portions being wider than the first portions. The outer middle land part is provided with a plurality of middle inclined grooves not directly interconnected with either the first major groove or the second major groove, a plurality of outer middle lug grooves connecting the second portions of the first major groove and the middle inclined grooves, and inner middle lug grooves connecting the middle inclined grooves and the second major groove. The outer middle lug (Continued)

grooves are provided to different positions in the tire circumferential direction than the inner middle lug grooves.

20 Claims, 14 Drawing Sheets

(52) U.S. Cl.
CPC ...... *B60C 11/0306* (2013.01); *B60C 11/1236* (2013.01); *B60C 2011/0334* (2013.01); *B60C 2011/0341* (2013.01); *B60C 2011/0346* (2013.01); *B60C 2011/0353* (2013.01); *B60C 2011/0358* (2013.01); *B60C 2011/0374* (2013.01); *B60C 2011/0376* (2013.01); *B60C 2011/0381* (2013.01); *B60C 2011/0386* (2013.01); *B60C 2011/0395* (2013.01)

(58) Field of Classification Search
CPC ..... B60C 2011/0334; B60C 2011/0341; B60C 2011/0346; B60C 2011/0353; B60C 2011/0358; B60C 2011/0374; B60C 2011/0376; B60C 2011/0381; B60C 2011/0386; B60C 2011/0395; B60C 11/03; B60C 11/04; B60C 11/13; B60C 11/00; B60C 11/01
USPC ........................................... 152/209.8, 209.3
See application file for complete search history.

(56) References Cited

U.S. PATENT DOCUMENTS

| 2010/0175799 A1* | 7/2010 | Takahashi | B60C 11/0309 |
| | | | 152/209.3 |
| 2013/0087261 A1 | 4/2013 | Kageyama | |
| 2014/0190606 A1* | 7/2014 | Takemoto | B60C 11/1218 |
| | | | 152/209.8 |
| 2014/0311638 A1* | 10/2014 | Takagi | B60C 11/0302 |
| | | | 152/209.8 |

FOREIGN PATENT DOCUMENTS

| JP | 2000-509675 A | | 8/2000 |
| JP | 2008-30605 A | | 2/2008 |
| JP | 2010260403 A | * | 11/2010 |
| JP | 2011-51425 A | | 3/2011 |
| JP | 2013-82308 A | | 5/2013 |
| JP | 2013-139240 A | | 7/2013 |

OTHER PUBLICATIONS

JP2010260403A_MT (Year: 2010).*
JPH05178015A_MT (Year: 1993).*
Extended European Search Report, dated Jul. 19, 2017, for European Application No. 14871688.9.

* cited by examiner

PNEUMATIC TIRE

TECHNICAL FIELD

The present invention relates to a pneumatic tire with an improved on-snow performance while maintaining steering stability.

BACKGROUND ART

Pneumatic tires for winter have a chance to be traveling on a dry road in addition to a snowy road. Accordingly, such a pneumatic tire for winter has been requested to improve steering stability as well as on-snow performance in good balance at a high level.

For example, in order to improve the on-snow performance by increasing snow-shearing force, a pneumatic tire including a tread portion provided with a lateral groove having a large volume has been proposed.

Unfortunately, in the above mentioned pneumatic tire, there is a problem that the steering stability deteriorates based on reduction of tread rigidity.

CITATION LIST

Patent Literature

Patent document 1: Japanese Unexamined Patent Application Publication No. 2011-51425
Patent document 2: Japanese Unexamined Patent Application Publication No. 2000-509675

SUMMARY OF INVENTION

Technical Problem

The present invention has been made in view of the above mentioned circumstances and has a major object to provide a pneumatic tire having an excellent on-snow performance while maintaining steering stability.

Solution to Problem

The present invention provides a pneumatic tire including a tread portion including a designated mounting orientation on a vehicle, an outboard tread edge located on an outboard of the vehicle when the tire is mounted on the vehicle and an inboard tread edge located on an inboard of the vehicle when the tire is mounted on the vehicle, the tread portion being provided with a circumferentially and continuously extending first main groove nearest to the outboard tread edge and a circumferentially and continuously extending second main groove adjacent to the first main groove on the side of the inboard tread edge to form an outboard middle land portion between the first main groove and the second main groove, the first main groove including first portions and second portions having a groove width greater than that of the first portions alternately in a circumferential direction of the tire, the outboard middle land portion being provided with a plurality of middle inclined grooves that is not directly communicated with neither the first main groove nor the second main groove, a plurality of outboard middle lug grooves connecting the second portions of the first main groove to the middle inclined grooves and inboard middle lug grooves connecting the middle inclined grooves to the second main grooves, and the outboard middle lug grooves being arranged at different locations to the inboard middle lug grooves with respect to a circumferential direction of the tire.

In the pneumatic tire in accordance with the present invention, a width of the first portions in an axial direction of the tire is preferably in a range of from 60% to 80% of a width of the second portions in the axial direction of the tire.

In the pneumatic tire in accordance with the present invention, preferably, the first main groove includes a groove edge on a side of a tire equator, the groove edge is configured as a zigzag manner alternately including first inclined elements inclined with respect to the circumferential direction of the tire and second inclined elements inclined at an angle with respect to the circumferential direction of the tire greater than that of the first inclined elements, and the second inclined elements are smoothly connected to a groove edge of the outboard middle lug grooves.

In the pneumatic tire in accordance with the present invention, preferably, the first inclined elements have an arc shape that is convex toward the tire equator.

In the pneumatic tire in accordance with the present invention, preferably, each middle inclined groove includes a first middle inclined element extending from an inner end on the side of the inboard tread edge to an outer end on the side of the outboard tread edge while increasing a groove width toward the outer end and a second middle inclined element connecting the outer end of the first middle inclined element to one of the outboard middle lug grooves and having a groove width smaller than that of the first middle inclined element.

In the pneumatic tire in accordance with the present invention, preferably, the inner end of the first middle inclined element is located on the tire equator.

In the pneumatic tire in accordance with the present invention, preferably, the outboard middle lug grooves include a first outboard middle lug groove and a second outboard middle lug groove having an axial length larger than that of the first outboard middle lug groove alternately in the circumferential direction of the tire, and each first middle inclined element is inclined toward the second main groove so as to extend from an inner end of one of the first outboard middle lug groove toward one side in the circumferential direction through an inner end of one of the second outboard middle lug groove which is adjacent to the first outboard middle lug groove.

In the pneumatic tire in accordance with the present invention, preferably, the second middle inclined element extends to the other side in the circumferential direction of the tire from the first middle inclined element toward the first main groove so as to communicate with one of the second outboard middle lug grooves.

In the pneumatic tire in accordance with the present invention, preferably, a maximum groove width of the first middle inclined element is greater than a groove width of the outboard middle lug grooves.

In the pneumatic tire in accordance with the present invention, preferably, the second outboard middle lug groove is in communication with a middle portion of one of the first middle inclined elements.

In the pneumatic tire in accordance with the present invention, preferably, the first middle inclined elements are inclined at an angle of from 10 to 30 degrees with respect to the circumferential direction of the tire.

In the pneumatic tire in accordance with the present invention, preferably, the inboard middle lug grooves include a first inboard middle lug groove and a second inboard middle lug groove having an axial length larger than that of the first inboard middle lug groove alternately in the circumferential direction of the tire, and outer ends of the first inboard middle lug groove and the second inboard middle lug groove are in communicate with one of the first middle inclined elements.

In the pneumatic tire in accordance with the present invention, preferably, the outer ends of the first inboard middle lug groove and the second inboard middle lug groove are in communication with one of the first middle inclined elements at different locations with respect to the inner end of the second outboard middle lug groove in the circumferential direction of the tire.

In the pneumatic tire in accordance with the present invention, preferably, the tread portion is further provided with a circumferentially and continuously extending a third main groove nearest to the inboard tread edge to form an inboard middle land portion between the second main groove and the third main groove, and the inboard middle land portion is configured as a rib that is not provided with any lateral grooves connecting the second main groove and the third main groove.

In the pneumatic tire in accordance with the present invention, preferably, the third main groove includes a straightly and circumferentially extending inboard groove edge on the side of the inboard tread edge.

In the pneumatic tire in accordance with the present invention, preferably, the third main groove includes a zigzag outboard groove edge on the side of the outboard tread edge.

In the pneumatic tire in accordance with the present invention, preferably, the inboard middle land portion is provided with an inboard middle sipe traversing the inboard middle land portion.

In the pneumatic tire in accordance with the present invention, preferably, the inboard middle land portion is provided with a plurality of middle lateral lug grooves extending axially inwardly from the third main groove and terminating within the inboard middle land portion, and the inboard middle sipe includes a first sipe connecting one of the middle lateral lug grooves to the second main groove and a second sipe connecting the third main groove to the second main groove.

In the pneumatic tire in accordance with the present invention, preferably, the inboard middle sipe is inclined in the same direction as the middle lateral lug grooves.

In the pneumatic tire in accordance with the present invention, preferably, the third main groove includes a zigzag outboard groove edge on the side of the outboard tread edge, the outboard groove edge includes a first edge portion inclined in a first direction with respect to the circumferential direction of the tire and a second edge portion inclined in an opposite direction to the first edge portion and having a circumferential length smaller than that of the first edge portion alternately in the circumferential direction of the tire, and the second sipe is connected to the second edge portion smoothly.

In the pneumatic tire in accordance with the present invention, preferably, a maximum axial width of the outboard middle land portion is in a range of from 1.5 to 4.5 times of a maximum axial width of the inboard middle land portion.

Advantageous Effects of Invention

The pneumatic tire in accordance with the present invention includes the outboard middle land portion formed between the first main groove and the second main groove, and the outboard middle land portion is provided with middle inclined grooves, outboard middle lug grooves and inboard middle lug grooves. The first main groove is configured to include the first portions and the second portions having a groove width greater than that of the first portions, and which are alternately arranged in the circumferential direction of the tire. That is, the second portions include portions that protrude from the first portions in the axial direction of the tire. The protruded portions compress snow and then shear it to generate snow-shearing force to improve on-snow performance.

The first main groove is disposed nearest to the outboard tread edge on which large ground contact pressure, at the time of cornering, acts. Thus, the second portion can compress snow firmly at the time of cornering. Accordingly, cornering performance on snowy road can be improved particularly.

The middle inclined grooves are not directly communicated with neither the first main groove nor the second main groove. Such a middle inclined groove may suppress reduction in rigidity of the outboard middle land portion to maintain steering stability of the tire.

The outboard middle lug grooves connect the second portions of the first main groove to the middle inclined grooves. Thus, lengthy axial groove combinations where the outboard middle lug grooves are communicated with the second portions are provided. These groove combinations can generate large snow-shearing force to further improve the on-snow performance.

The inboard middle lug grooves connect the middle inclined grooves and the second main groove. That is, the middle inclined grooves are communicated with the first main groove and the second main groove through the outboard middle lug grooves and the inboard middle lug grooves respectively. Furthermore, the middle inclined grooves include a component in the axial direction of the tire and a component in the circumferential direction of the tire. Thus, snow in the middle inclined grooves can be effectively discharged to the first main groove or the second main groove using a rolling or cornering force, and therefore the on-snow performance can further improve.

The outboard middle lug grooves are arranged at different locations to the inboard middle lug grooves in the circumferential direction of the tire. The rigidity in the axial direction of the middle land portion is ensured in good balance in the circumferential direction of the tire, and thus the steering stability is maintained more effectively.

Accordingly, the pneumatic tire in accordance with the present invention can improve on-snow performance while maintaining steering stability.

DESCRIPTION OF EMBODIMENTS

Figure 1:
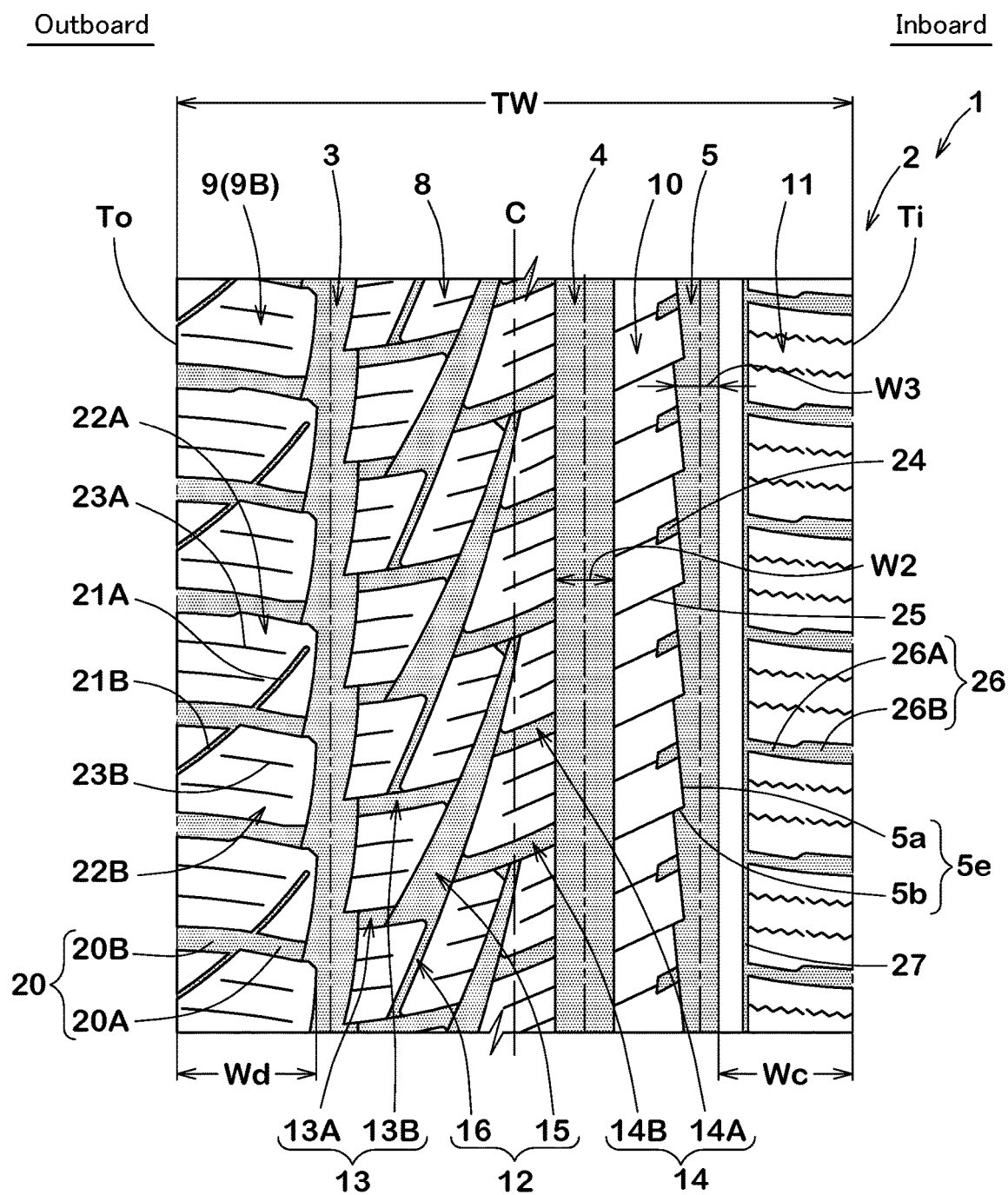
FIG. 1 is a development view of a tread portion illustrating an embodiment of the present invention.

Hereinafter, an embodiment of the present invention will be described with reference to the accompanying drawings. FIG. 1 illustrates a developed view of a tread portion 2 of a pneumatic tire 1 illustrating an embodiment of the present invention. As illustrated in FIG. 1, the pneumatic tire in accordance with the present embodiment (hereinafter, simply referred to as "tire") 1, is suitably used as studless tires for passenger cars, for example.

The tread portion 2 of the tire 1 includes an asymmetric tread pattern having a designated mounting orientation on a vehicle. The tread portion 2 includes an outboard tread edge To located on an outboard of the vehicle when the tire is mounted on the vehicle and an inboard tread edge Ti located on an inboard of the vehicle when the tire is mounted on the vehicle. The mounting orientation on a vehicle, for example, is displayed using characters or the like on a sidewall portion (not shown).

The tread edges To and Ti are defined as axially outermost edges of the ground contacting patch of the tread portion 2 which occurs under a normal state with a standard tire load when the camber angle of the tire is zero, wherein the normal state is such that the tire is mounted on a standard rim with a standard pressure but is loaded with no tire load. An axial distance between the tread edges To and Ti under the normal state is defined as a tread width TW. Unless otherwise noted, dimensions of respective portions of the tire are values measured under the normal state.

The standard wheel rim is a wheel rim approved for each tire by standards organizations on which the tire is based, wherein the standard wheel rim is the "standard rim" specified in JATMA, the "Design Rim" in TRA, and the "Measuring Rim" in ETRTO, for example.

The standard pressure is a standard pressure approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example. When the tire is for passenger cars, the standard pressure is defined as 180 kPa.

The standard tire load is a tire load approved for each tire by standards organizations in which the tire is based, wherein the standard tire load is the "maximum load capacity" in JATMA, the maximum value given in the above-mentioned table in TRA, the "Load Capacity" in ETRTO, for example. When the tire is for passenger cars, the standard tire load is defined as a load of 88% of the above mentioned load.

The tread portion 2 is provided with a plurality of main grooves extending continuously in the circumferential direction of the tire. The main grooves in accordance with the present embodiment include a first main groove 3, a second main groove 4, and a third main groove 5.

Figure 2:
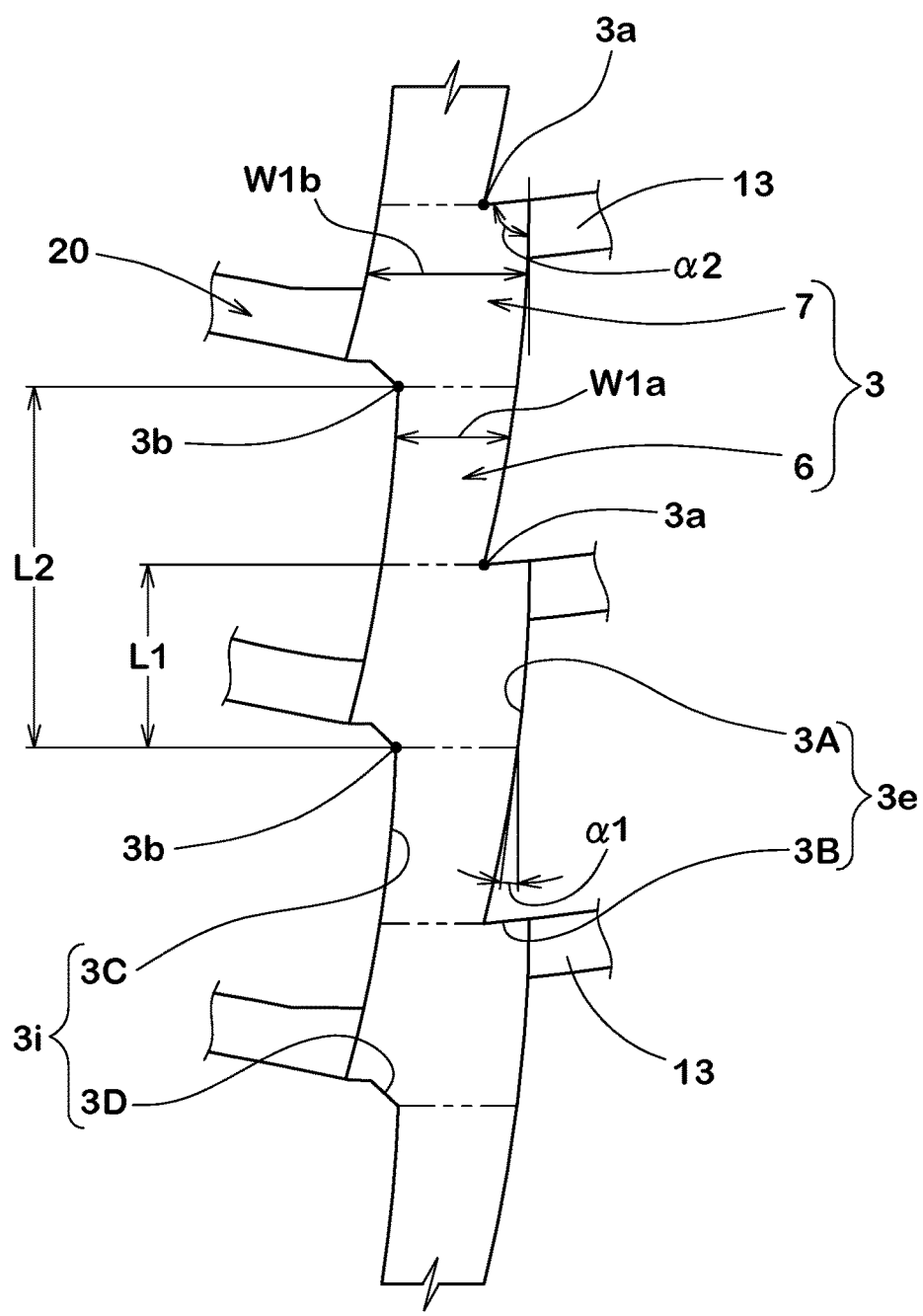
FIG. 2 is an enlarged view of a first main groove in FIG. 1.

The first main groove 3 is disposed nearest to the outboard tread edge To. FIG. 2 illustrates an enlarged view of the first main groove 3. As illustrated in FIG. 2, the first main groove 3 in accordance with the present embodiment includes first portions 6 and second portions 7 having a groove width greater than that of the first portions 6 alternately in the circumferential direction of the tire. The second portions 7 include portions that protrude from the first portions in the axial direction of the tire. The protruded portions may compress snow and then shear it to generate snow-shearing to improve on-snow performance.

The first portions 6 and the second portions 7 are defined by two kinds of boundaries, wherein one is an axial line passing a point 3a that is nearest to the outboard tread edge To and that is on a groove edge 3e of the first main groove 3 on the side of the tire equator C, and wherein the other one is an axial line passing a point 3b that is nearest to the tire equator C and that is on an axially outer groove edge 3i of the first main groove 3. In FIG. 2, boundaries between the first portions 6 and the second portions 7 are illustrated by a phantom line.

Preferably, the lengths L1 of the second portions 7 in the circumferential direction of the tire are in a range of from 35% to 65% of a pitch of first main grooves 3 (i.e., a circumferential length L2 between a pair of circumferentially adjacent points 3b and 3b on the side of the tire equator C). When the lengths L1 are less than 35% or more than 65% of the length L2, rigidity of a land portion around the points 3a on the outboard tread edge or rigidity of a land portion around the points 3b on the side of the tire equator is lowered, and thus steering stability tends to be deteriorated.

Preferably, a groove width W1a of the first portions 6 in the axial direction of the tire is in a range of from 60% to 80% of a groove width W1b of the second portions 7 in the axial direction of the tire. When the groove width W1a of the first portions 6 is more than 80% of the groove width W1b of the second portions 7, the above mentioned protruded portions become small and thus on-snow performance would be lowered. When the groove width W1a of the first portions 6 is less than 60% of the groove width W1b of the second portions 7, the rigidity of the above mentioned protruded portions are lowered, and thus steering stability would be deteriorated. The groove widths W1a and W1b of the first portions 6 and the second portions 7 respectively are defined as its maximum width of the groove.

Preferably, the groove width W1a of the first portions 6 is in a range of from 2% to 10% of the tread width TW. Preferably, a groove depth (not illustrated) of the first main grooves 3 is of from 3 to 10 mm.

The groove edge 3e of the first main groove 3 on the side of the tire equator C, for example, is configured as a zigzag manner alternately comprising a first inclined element 3A inclined with respect to the circumferential direction of the tire and a second inclined element 3B inclined at an angle with respect to the circumferential direction of the tire greater than that of the first inclined element 3A. Such a groove edge 3e can increase braking force and traction on snow utilizing an axial edge component of the second inclined element 3B.

The first inclined element 3A, for example, is configured as an arc shape that is convex toward the tire equator C. Such a first inclined element 3A is to secure a large groove volume of the above mentioned protruded portions to improve on-snow performance, while maintaining the rigidity of the land portion adjacent to the first inclined portion 3A.

Although not particularly limited, in order to ensure the rigidity of the land portion on the side of the groove edge 3e while offering sufficient snow-shearing force, an angle $\alpha 1$ of the first inclined element 3A is preferably in a range of from 2 to 15 degrees with respect to the circumferential direction of the tire. Furthermore, the angle $\alpha 2$ of the second inclined element 3B is preferably in a range of from 70 to 90 degrees with respect to the circumferential direction of the tire. The angles $\alpha 1$ and $\alpha 2$ are angles at an intermediate position of the length of each inclined element 3A and 3B.

The axially outer groove edge 3i of the first main groove 3, for example, is configured as a zigzag manner alternately comprising a third inclined element 3C inclined with respect to the circumferential direction of the tire and a fourth inclined element 3D inclined at an angle with respect to the circumferential direction of the tire larger than that of the third inclined element 3C.

The first main groove 3 is disposed on the side of the outboard tread edge To where large ground contact pressure acts at the time of cornering. Thus, the second portion 7 can compress snow firmly when cornering. Accordingly, the cornering performance on snow can improve.

As illustrated in FIG. 1, the second main groove 4 is adjacent to the first main groove 3 on the side of the inboard tread edge Ti. The second main groove 4, for example, is disposed on the side of the inboard tread edge Ti with respect to the tire equator C. The second main groove 4 in accordance with the present embodiment extends in a straight shape along the circumferential direction of the tire. Such a second main groove 4 increases rigidity of the land portion around the second main groove 4.

The third main groove 5 is disposed nearest to the inboard tread edge Ti. The third main groove 5 in accordance with the present embodiment extends in a saw-blade manner. Such a third main groove 5 includes an axial component in the groove edges, and can increase snow-shearing force to improve on-snow performance.

Figure 3:
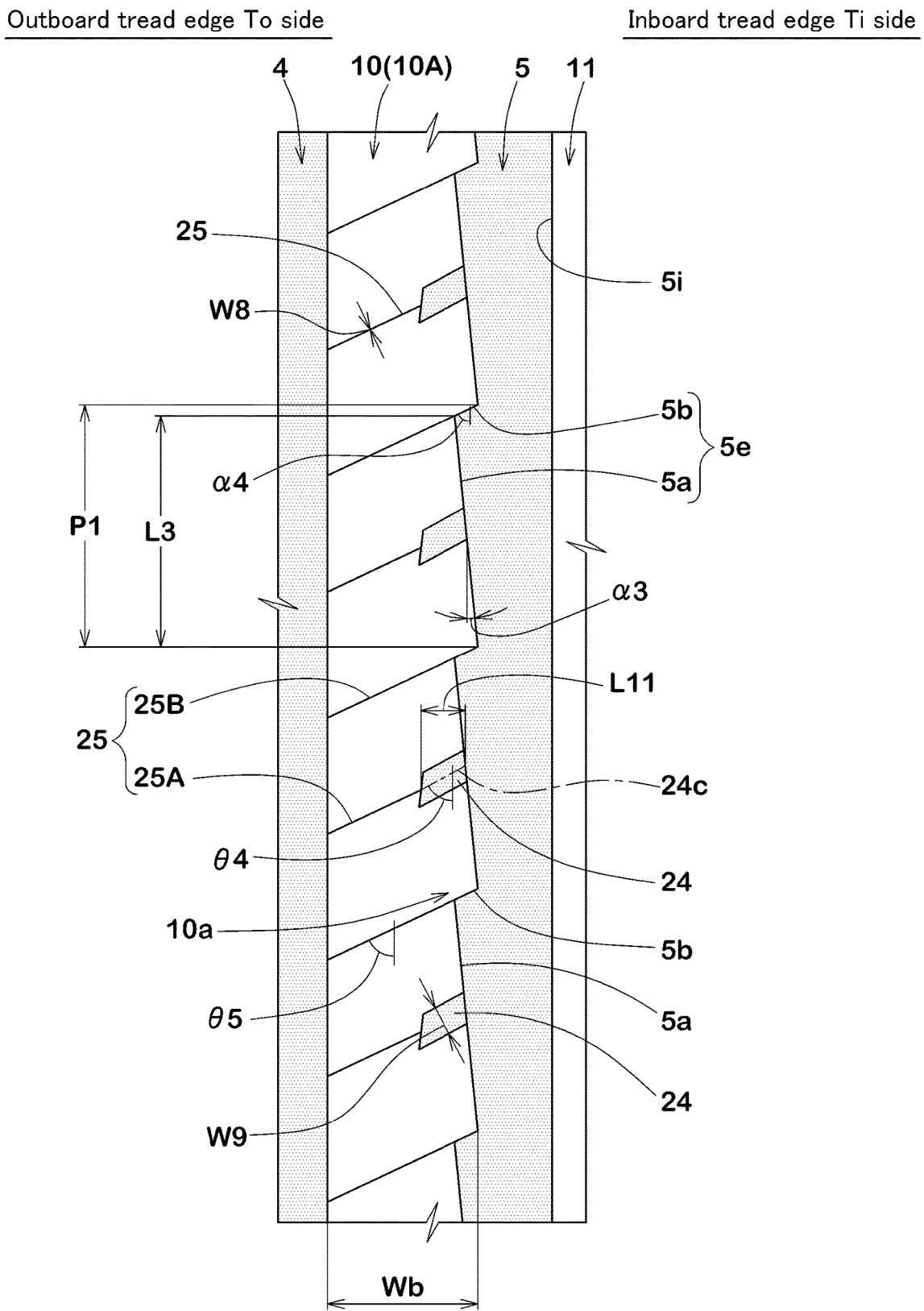
FIG. 3 is an enlarged view of a third main groove and an inboard middle land portion of FIG. 1.

FIG. 3 illustrates an enlarged view of the third main groove 5. As illustrated in FIG. 3, the third main groove 5 includes an inboard groove edge 5i on the side of the inboard tread edge Ti and an outboard groove edge 5e on the side of the outboard tread edge To.

The inboard groove edge 5i extends in straight shape along the circumferential direction of the tire. Thus, rigidity of a land portion around the groove edge 5i on the side of the inboard tread edge Ti may be increased so as to improve steering stability of the tire.

The outboard groove edge 5e extends in a zigzag manner. The outboard groove edge 5e in accordance with the present embodiment includes a first edge portion 5a inclined in a direction with respect to the circumferential direction of the tire and a second edge portion 5b inclined in an opposite direction to the first edge portion 5a and having a circumferential length smaller than that of the first edge portion 5a alternately in the circumferential direction of the tire.

Preferably, the angle $\alpha 3$ of the first edge portion 5a is of from 2 to 10 degrees with respect to the circumferential direction of the tire. Thus, it may receive a large lateral force when cornering, and thus steering stability can improve. In order to effectively ensure such function, a length L3 of the first edge portion 5a in the circumferential direction of the tire is preferably in a range of from 90% to 96% of one zigzag pitch P of the outboard groove edge 5e.

The angle $\alpha 4$ of the second edge portion 5b is preferably in a range of not less than 60 degrees, more preferably not less than 70 degrees with respect to the circumferential direction of the tire. Thus, the second edge portion 5b may generate snow-shearing force to improve on-snow performance.

Groove widths W2 and W3 in the axial direction of the tire and groove depths (not illustrated) of the second main groove 4 and the third main groove 5 can be determined variously according to convention. Preferably, the groove widths W2 and W3 of the second main groove 4 and the third main groove 5 respectively are in a range of from 3% to 12% of the tread width TW, for example. The groove depths of the second main groove 4 and the third main groove 5, in case of passenger car tires, are preferably of from 3 to 10 mm.

In the tread portion 2, an outboard middle land portion 8, an outboard shoulder land portion 9, an inboard middle land portion 10 and inboard shoulder land portion 11 are separated by the respective main grooves 3 to 5.

Figure 4:
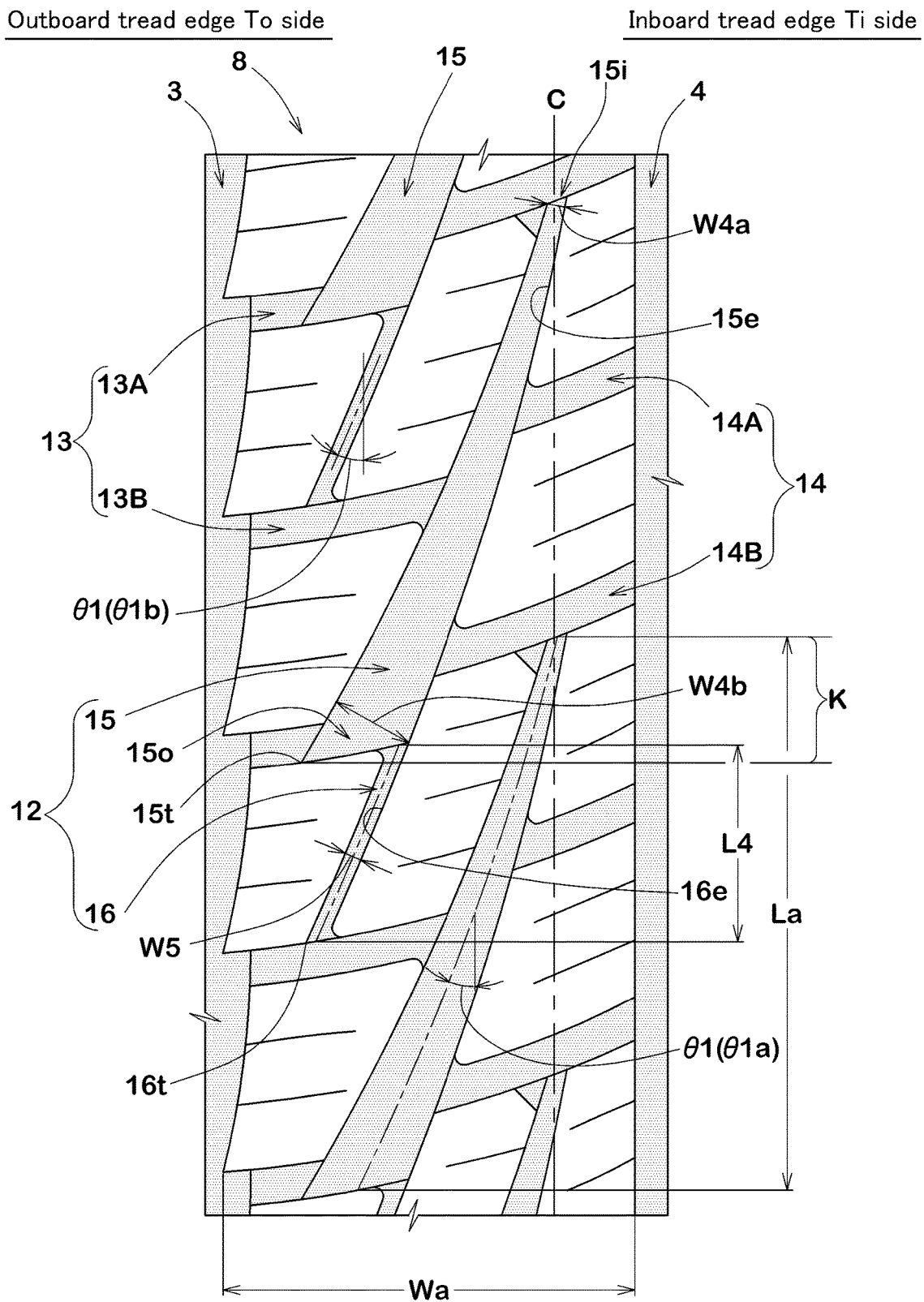
FIG. 4 is an enlarged view of an outboard middle land portion of FIG. 1.

FIG. 4 illustrates an enlarged view of the outboard middle land portion 8. As illustrated in FIG. 4, the outboard middle land portion 8 is formed between the first main groove 3 and the second main groove 4. The outboard middle land portion 8 according to the present embodiment is provided on a tread central region including the tire equator C.

The outboard middle land portion 8 is provided with a plurality of middle inclined grooves 12, outboard middle lug grooves 13 and inboard middle lug grooves 14.

The middle inclined grooves 12 are inclined in one direction continuously with respect to the circumferential direction of the tire. The middle inclined grooves 12 ensure steering stability by maintaining sufficient rigidity of the outboard middle land portion 8.

The middle inclined grooves 12 are not directly communicated with neither the first main groove 3 nor the second main groove 4. That is, the respective ends of the middle inclined grooves 12 terminate within the outboard middle land portion 8. The middle inclined grooves 12 may surely maintain sufficient high rigidity of the outboard middle land portion 8.

When an angle $\theta 1$ of the middle inclined grooves 12 is less than 10 degrees, on-snow performance of the tire may be deteriorated due to insufficient axial components of the middle inclined grooves 12. When the angle $\theta 1$ of the middle inclined grooves 12 is more than 30 degrees, ends of the middle inclined grooves 12 may be located near the first main groove 3 or the second main groove 4, and thus axial rigidity of the end portions of the outboard middle land portion 8 may be deteriorated. Preferably, the angle $\theta 1$ of the middle inclined grooves 12 is of from 10 to 30 degrees with respect to the circumferential direction of the tire. In this description, an angle of a groove is measured using the groove centerline. The groove centerlines of the middle inclined grooves 12 are line segments that successively connect middle points of lines in the axial direction that extends between both groove edges.

Each of the middle inclined grooves 12 includes a first middle inclined element 15 and a second middle inclined element 16 having a groove width smaller than that of the first middle inclined element 15.

The first middle inclined element 15 includes an inner end 15i on the side of the inboard tread edge Ti and an outer end 15o on the side of the outboard tread edge To. The first middle inclined element 15 has a groove width gradually increasing from the inner end 15i to the outer end 15o. In the first middle inclined element 15, the inner end 15i is a portion having the minimum groove width, and the outer end 15o is a portion having the maximum groove width.

The inner end 15i of the first middle inclined element 15 is located on the tire equator C. Thus, the tire can compress snow firmly to generate large snow-shearing force on the tire equator C where large ground contact pressure acts at the time of straight running, and therefore on-snow performance can improve.

The outer end 15o of the first middle inclined element 15 is located farthest from the tire equator C. Thus, the first middle inclined element 15 may increase snow-shearing force due to its large axial components. The first middle inclined element 15 is inclined from the outer end 15o toward the second main groove 4 to one circumferential direction of the tire.

Each first middle inclined element 15 overlaps adjacent another first middle inclined element 15 in the circumferential direction of the tire so as to have an overlap portion K. Thus, further large snow-shearing force may be obtained, and therefore on-snow performance can improve In order to balance on-snow performance and steering stability, a groove width W4a of the inner ends 15i is preferably in a range of 2% to 8% of the axial maximum width Wa of the outboard middle land portion 8, more preferably in a range of from 2% to 6%. In the same point of view, a groove width W4b of the outer ends 15o is preferably in a range of from 10% to 35% of the axial maximum width Wa of the outboard middle land portion 8, more preferably in a range of from 15% to 30%. In this description, a groove width of an inclined groove as well as a lug groove described later are a distance between a pair of groove edge measured perpendicular to the groove centerline. A groove depth (not illustrated) of the first middle inclined elements 15 is preferably of from 3 to 9 mm. Furthermore, a groove depth of the first middle inclined elements 15 is preferably in a range of from 70% to 100% of the main grooves.

Preferably, an angle θ1a of the first middle inclined elements 15 is of from 10 to 30 degrees with respect to the circumferential direction of the tire. When the angle θ1a is less than 10 degrees, on-snow performance of the tire may be deteriorated due to insufficient axial components of the first middle inclined elements 15. When the angle θ1a is more than 30 degrees, the inner ends 15i or the outer ends 15o are located near the first main groove 3 or the second main groove 4, and thus rigidity of the outboard middle land portion 8 may be reduced.

The angle θ1a of the first middle inclined elements 15 gradually increases axially outwardly. The first middle inclined elements 15 may increase rigidity of an axially outer portion of the outboard middle land portion 8 where large ground contact pressure acts when cornering. Thus, the steering stability can further improve.

The second middle inclined elements 16 extend from the outer ends 15o of the first middle inclined elements 15 toward the outboard tread edge To and include outer ends 16t terminating within the outboard middle land portion 8. The second middle inclined elements 16 are inclined from the first middle inclined elements 15 toward the first main groove 3 to the other circumferential direction of the tire.

Since the second middle inclined elements 16 include axial components, on-snow performance of the tire can further be improved.

The outer ends 16t of the second middle inclined elements 16 are provided axially inward of the outer ends 15t of the first middle inclined elements 15. Thus, rigidity of portions each formed between an outer end 16t and the first main groove 3 on the outboard middle land portion 8 can be ensured.

The second middle inclined elements 16 according to the present embodiment include groove edges 16e on the side of the tire equator C that are smoothly connected to the groove edges 15e of the first middle inclined elements 15 on the side of the tire equator C. Thus, high rigidity in the outboard middle land portion 8 would be ensured. In this embodiment, the groove edges 16e of the second middle inclined elements 16 and the groove edges 15e of the first middle inclined elements 15 are smoothly continued in an arc manner.

The second middle inclined elements 16 extend with a substantially constant groove width W5. High rigidity in the outboard middle land portion 8 around the second middle inclined element 16 may further be ensured.

In order to compress snow firmly while ensuring high rigidity of the outboard middle land portion 8, a groove width W5 of the second middle inclined elements 16 is preferably in a range of from 1% to 7% of the maximum width Wa of the outboard middle land portion 8. In this embodiment, the second middle inclined elements 16 have smaller groove widths than those of the first middle inclined elements 15. Preferably, the groove widths W5 of the second middle inclined elements 16 are smaller than the groove widths W4a of the inner ends 15i of the first middle inclined elements 15. Preferably, the groove widths W5 of the second middle inclined elements 16 are in a range of from 75% to 95% of the groove widths W4a of the inner end 15i of the first middle inclined element 15. Preferably, the groove widths W5 of the second middle inclined elements 16 are of from 2 to 4 mm.

Preferably, the angles θ1b of the second middle inclined elements 16 are of from 10 to 30 degrees with respect to the circumferential direction of the tire in order to ensure sufficient rigidity of the outboard middle land portion 8 while achieving snow-shearing force.

Furthermore, the lengths L4 of the second middle inclined elements 16 in the circumferential direction of the tire are preferably in a range of from 25% to 45% of the lengths La of the first middle inclined elements 15 in the circumferential direction of the tire. Preferably, a groove depth (not illustrated) of the second middle inclined elements 16 is of from 10% to 60% of the groove depths of the first middle inclined elements 15. Preferably, the second middle inclined elements 16 have the groove depth in a range of from 3 to 7 mm.

The outboard middle lug grooves 13 connect the second portions 7, which have greater groove widths than the first portions 6, and the middle inclined grooves 12. Thus, large axial groove components in which the outboard middle lug grooves 13 and the second portions 7 are communicated with each other can be formed. Such a groove component generates large snow-shearing force so as to further improve on-snow performance. Furthermore, since the outboard middle lug grooves 13 are provided on the side of the outboard tread edge To, the second portions 7 as well as the outboard middle lug grooves 13 may compress snow firmly when cornering, and thus on-snow performance of the tire can further improve. Note that the outboard middle lug grooves 13 are in communication with the second middle inclined elements 16.

Figure 5:
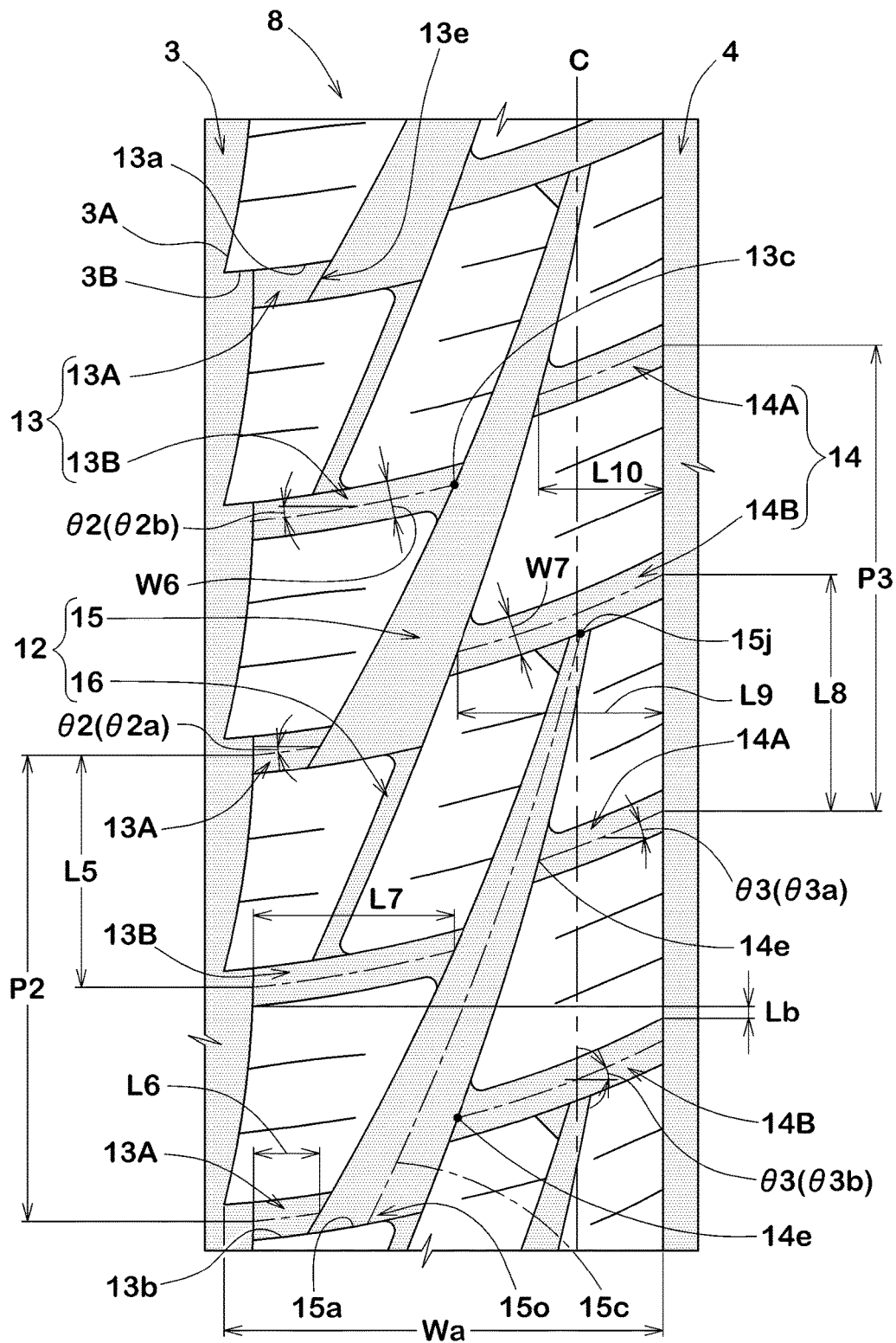
FIG. 5 is an enlarged view of an outboard middle land portion of FIG. 1.

FIG. 5 illustrates an enlarged view of the outboard middle land portion 8. As illustrated in FIG. 5, each of the outboard middle lug grooves 13 has a groove edge 13a that is connected smoothly to one of the second inclined elements 3B of the first main grooves 3 smoothly. Accordingly, stress concentration at axially inner end portions of the second inclined elements 3B is reduced, and thus rigidity of the outboard middle land portion 8 on the side of the outboard tread edge To can be enhanced. In this embodiment, the groove edges 13a of the outboard middle lug grooves 13 and the second inclined elements 3B form a smooth arc shape.

The outboard middle lug grooves 13 include first outboard middle lug grooves 13A and second outboard middle lug grooves 13B having an axial length greater than that of the first outboard middle lug grooves 13A, and which are arranged alternately in the circumferential direction of the tire. The outboard middle lug grooves 13 may increase the snow-shearing force while maintaining rigidity of the outboard middle land portion 8.

In this embodiment, each axially inner end 13e of the first outboard middle lug grooves 13A is in communication with one of the outer ends 15o of the first middle inclined elements 15. More specifically, a groove edge 13b of the first outboard middle lug groove 13A is connected smoothly to the groove edges 15a of the outer end 15o of one of the first middle inclined elements 15. Thus, snow in the first middle inclined element 15 is discharged to the first main groove 3 through the first outboard middle lug groove 13A effectively, and thus on-snow performance improves. The groove edge 13b of the first outboard middle lug groove 13A and the groove edge 15a of the outer end 15o of the first middle inclined element 15t form a smooth arc shape.

Each second outboard middle lug groove 13B is in communication with one of the second middle inclined elements 16. Thus, snow in the second middle inclined element 16 is discharged to the first main groove 3 smoothly through the second outboard middle lug groove 13B.

The inner end 13c of the second outboard middle lug groove 13B is in communication with a middle portion in a length La in the circumferential direction of the tire of one of the first middle inclined elements 15. Thus, the first outboard 1s middle lug groove 13A and the second outboard middle lug groove 13B would be arranged in the circumferential direction of the tire at substantially the same pitches. This would ensure high rigidity of the outboard middle land portion 8 on the side of the outboard tread edge To, and would offer snow-shearing force at intervals of the pitches. This means that the inner end 13c of the groove centerline of the second outboard middle lug groove 13B is located in a circumferential area centered on the middle point with a 30% length of the length La of the first middle inclined element 15.

Preferably, a circumferential distance L5 between the first outboard middle lug groove 13A and the second outboard middle lug groove 13B is in a range of from 40% to 60% of a pitch P2 between first outboard middle lug grooves 13A in the circumferential direction of the tire. When the distance L5 is less than 40% or more than 60% of the pitch P2 of the first outboard middle lug grooves 13A, rigidity balance in the circumferential direction of the tire of the axially outer portion of the outboard middle land portion 8 tends to be deteriorated, and thus steering stability may be deteriorated.

The outboard middle lug grooves 13, for example, extend with a substantially constant groove width. The outboard middle lug grooves 13 may maintain high rigidity of the outboard middle land portion 8.

Preferably, the outboard middle lug grooves 13 have a groove width W6 smaller than the maximum groove width W4b of the first middle inclined elements 15. When the maximum groove width W4b of the first middle inclined element 15 is excessively large as compared with the groove width W6 of the outboard middle lug grooves 13, rigidity in the outboard middle land portion 8 may be reduced, and snow-shearing force may be deteriorated. Thus, the groove width W6 of the outboard middle lug grooves 13 is preferably in a range of from 1/3 to 1/2 times the maximum groove width W4b of the first middle inclined elements 15. In order to generate large snow-shearing force while maintaining sufficient rigidity of the outboard middle land portion 8, the groove width W6 of the outboard middle lug grooves 13 are of from 4 to 9 mm.

In the same point of view, a groove depth of the outboard middle lug grooves 13 (not illustrated) is preferably in a range of from 3 to 7 mm. Preferably, a groove depth of the outboard middle lug grooves 13 is of from 80% to 100% of a groove depth of main grooves 3.

Preferably, an angle $\theta 2$ of the outboard middle lug grooves 13 is of from 5 to 20 degrees with respect to the axial direction of the tire in order to discharge smoothly snow in the outboard middle lug grooves 13 utilizing tire rotation while ensuring large axial components of the grooves.

In order to improve steering stability while uniformizing circumferential rigidity of the axially outer portion of the outboard middle land portion 8, an absolute values ($\theta 2a - \delta 2b$) of the difference between the angles $\theta 2b$ of the second outboard middle lug grooves 13B relative to the axial direction of the tire and the angles $\theta 2b$ of the first outboard middle lug grooves 13A is in a range of not more than 10 degrees, and more preferably not more than 5 degrees.

In order to further improve the function described above effectively, an axial length L6 of the first outboard middle lug grooves 13A is preferably in a range of from 5% to 25% of the maximum width Wa of the outboard middle land portion 8. An axial length L7 of the second outboard middle lug grooves 13B is preferably in a range of from 2.5 to 4.0 times of the axial length L6 of the first outboard middle lug grooves 13A.

The inboard middle lug grooves 14 connect the second main groove 4 and the middle inclined grooves 12. Thus, snow in the middle inclined grooves 12 may be discharged to the second main groove 4 through the inboard middle lug grooves 14 utilizing tire rotation as well as cornering force. In this embodiment, the inboard middle lug grooves 14 are in communication with the first middle inclined elements 15.

The inboard middle lug grooves 14 according to the present embodiment include first inboard middle lug grooves 14A and second inboard middle lug grooves 14B having axial lengths larger than those of the first inboard middle lug grooves 14A alternately in the circumferential direction of the tire.

The inboard middle lug grooves 14 are arranged at different locations to the outboard middle lug grooves 13 in the circumferential direction of the tire. Thus, steering stability of the tire can be ensured by axial rigidity that is maintained in the circumferential direction of the tire in good balance. In this embodiment, the first inboard middle lug grooves 14A and the second inboard middle lug grooves 14B do not overlap with any first outboard middle lug grooves 13A and second outboard middle lug grooves 13B in the axial direction of the tire.

Preferably, each outer end 14e of the first inboard middle lug grooves 14A and the second inboard middle lug grooves 14B is in communication with one of the first middle inclined elements at a different location in the circumferential direction of the tire with respect to each inner end 13c of the second outboard middle lug grooves 13B. Thus, snow in the first middle inclined elements 15 may be effectively discharged. In the same point of view, preferably, each outer end 14e of the first inboard middle lug grooves 14A and the second inboard middle lug grooves 14B is in communication with one of the first middle inclined elements 15 at a different location in the circumferential direction of the tire with respect to each inner end 13e of the first outboard middle lug grooves 13A.

In order to exhibit the function described above, a minimum distance Lb in the circumferential direction of the tire between one of the inboard middle lug grooves 14 and one of the outboard middle lug grooves 13 is of from 2% to 12% of the maximum width Wa of the outboard middle land portion 8. When the minimum distance Lb is more than 12% of the maximum width Wa of the outboard middle land portion 8, on-snow performance may deteriorate.

In this embodiment, the inboard middle lug grooves 14 and the outboard middle lug grooves 13 are arranged alternately in the circumferential direction of the tire. This gives better circumferential rigidity balance to the outboard middle land portion 8.

In this embodiment, the outboard middle land portion 8, in order of the circumferential direction of the tire, is provided with the first inboard middle lug grooves 14A, the second outboard middle lug grooves 13B, the second inboard middle lug grooves 14B and the first outboard middle lug grooves 13A. Thus, circumferential rigidity of the outboard middle land portion 8 on the axially both sides can be maintained in good balance.

In order to effectively exhibit the function described above, a distance L8 in the circumferential direction of the tire between one of the first inboard middle lug grooves 14A and one of the second inboard middle lug grooves 14B is preferably of from 40/a to 60% of a circumferential pitch P3 between first inboard middle lug grooves 14A and 14A.

Each middle portion of the second inboard middle lug grooves 14B in the axial direction is communicated with each first middle inclined element 15. Thus, high rigidity of the outboard middle land portion 8 may be ensured. Here, "the axial middle portion of the second inboard middle lug groove 14B is in communication with the first middle inclined element 15" means that the inner end 15j of the groove centerline of the first middle inclined element 15 is located within a region which has a 30% axial length of the length L9 and is centered on the axial middle point of the axial length L9 on the second inboard middle lug grooves 14B. In this embodiment, the first middle inclined elements 15 are in communication with the second inboard middle lug grooves 14B on the tire equator C.

The inboard middle lug grooves 14, for example, extend with a substantially constant groove width W7. Thus, high rigidity of the outboard middle land portion 8 may be ensured.

The groove width W7 of the inboard middle lug grooves 14 is preferably of from 4 to 9 mm in order to form a large snow column while ensuring high rigidity of the outboard middle land portion 8. In the same point of view, a groove depth of the inboard middle lug grooves 14 (not illustrated) is preferably in a range of from 3 to 7 mm. Preferably, the groove depth of the inboard middle lug grooves 14 is in a range of from 80% to 100% of the main grooves 4.

Although not particularly limited, the axial length L9 of the second inboard middle lug grooves 14B is in a range of from 35 to 55% of the maximum width Wa of the outboard middle land portion 8. The axial lengths L10 of the first inboard middle lug grooves 14A are preferably in a range of from 25% to 75% of the axial lengths L9 of the second inboard middle lug grooves 14B.

An angle $\theta 3$ of the inboard middle lug grooves 14 with respect to the axial direction of the tire is preferably greater than an angle $\theta 2$ of the outboard middle lug grooves 13. Thus, snow in the inboard middle lug grooves 14 provided on the side of the tire equator C may effectively discharged backwardly smoothly utilizing tire rotation, and snow in the outboard middle lug grooves 13 may be discharged toward the first main groove 3 smoothly utilizing cornering force. In this point of view, the angles $\theta 3$ of the inboard middle lug grooves 14 are preferably in a range of from 10 to 30 degrees.

In view of improving the steering stability by uniformatizing circumferential rigidity in an axially inner portion of the outboard middle land portion 8, an absolute value ($\theta 3a-\theta 3b$) of the difference between one of the angles $\theta 3b$ of the second inboard middle lug grooves 14B with respect to the axial direction of the tire and one of the angles $\theta 3a$ of the first inboard middle lug grooves 14A with respect to the axial direction of the tire is preferably not more than 10 degrees, more preferably not more than 5 degrees.

The middle inclined grooves 12, the outboard middle lug grooves 13 and the inboard middle lug grooves 14 are inclined in the same direction with respect to the circumferential direction of the tire (e.g., right upward in FIG. 5). Thus, high rigidity of the outboard middle land portion 8 may further be ensured.

As illustrated in FIG. 1, the outboard shoulder land portion 9 is disposed between the outboard tread edge To and the first main groove 3. The outboard shoulder land portion 9 is provided with a plurality of outer shoulder lateral grooves 20 connecting the outboard tread edge To with the first main groove 3. Thus, the outboard shoulder land portion 9 is formed as a block row which includes a circumferentially arranged outboard shoulder blocks 9B separated by the outboard tread edge To, the first main groove 3 and the outer shoulder lateral grooves 20.

The outer shoulder lateral grooves 20 according to the embodiment include inner portions 20A disposed axially inwardly and outer portions 20B disposed on the side of the outboard tread edge To with respect to the inner portions 20A and having groove widths greater than those of the inner portions 20A. The outer shoulder lateral grooves 20 may discharge snow in grooves smoothly through the outboard tread edge To.

The outboard shoulder blocks 9B include a first outboard block 22A and a second outboard block 22B which are alternately arranged in the circumferential direction of the tire. The first outboard block 22A is provided with a first inclined narrow groove 21A extending axially inwardly from one of the outer shoulder lateral grooves 20 and terminating within the outboard shoulder block 9B. The second outboard block 22B is provided with a second inclined narrow groove 21B extending axially outwardly from one of the outer shoulder lateral grooves 20 to the outboard tread edge To. The first inclined narrow groove 21A and the second inclined narrow groove 21B are connected smoothly through one of the outer shoulder lateral grooves 20.

The first outboard block 22A is provided with an outer sipe 23A extending axially inwardly from the outboard tread edge To and terminating within the first outboard block 22A without reaching the first incline narrow groove 21A.

The second outboard block 22B is provided with an inner sipe 23B disposed axially inward of the second inclined narrow groove 21B and having both ends located within the second outboard block 22B.

The inboard middle land portion 10 is disposed between the second main groove 4 and the third main groove 5. The inboard middle land portion 10 is configured as a rib 10A that is not provided with any lateral grooves connecting the second main groove 4 with the third main groove 5. Since the inboard middle land portion 10 has high rigidity, an excellent steering stability on dry condition can be exhibited.

As illustrated in FIG. 3, the inboard middle land portion 10 is provided with middle lateral lug grooves 24 and inboard middle sipes 25 having a width W8 equal to or less than 0.8 mm. The middle lateral lug grooves 24 increase snow-shearing force while preventing reduction of rigidity of the inboard middle land portion 10. The inboard middle sipes 25 can reduce rigidity in the inboard middle land portion 10 to open the middle lateral lug grooves 24 widely so as to form a large snow column therein when coming into contact with the ground.

The middle lateral lug grooves 24 extend toward the tire equator C from the third main groove 5 and terminate within the inboard middle land portion 10. Thus, snow in the middle lateral lug grooves 24 is effectively discharged toward the third main groove 5 utilizing large lateral force when cornering.

The middle lateral lug grooves 24 are provided at middle portions in the circumferential direction of the tire of the first edge portions 5a. Such middle lateral lug grooves 24 can suppress excessive reduction in rigidity of the inboard middle land portion 10.

Preferably, the groove widths W9 of the middle lateral lug grooves 24 are in a range of from 5% to 20% of the pitch P1 of the groove edge 5e on the side of the outboard tread edge To of the third main groove 5. Furthermore, the axial lengths L11 of the middle lateral lug grooves 24 are preferably in a range of from 20% to 40% of the maximum axial width Wb of the inboard middle land portion 10. The lengths L11 of the middle lateral lug grooves 24 are axial lengths of the groove centerlines 24c of the middle lateral lug grooves 24. Preferably, the groove depths of the middle lateral lug grooves 24 are in a range of from 65% to 85% of the depths of the main grooves 4.

Preferably, angles θ4 of the middle lateral lug grooves 24 are not less than 60 degrees with respect to the circumferential direction of the tire. When the angles θ4 of the middle lateral lug grooves 24 are less than 60 degrees, on-snow performance of the tire may be deteriorated due to less axial components of the middle lateral lug grooves 24. More preferably, the angles θ4 of the middle lateral lug grooves 24 are not less than 65 degrees.

The inboard middle sipes 25 are full opened sipes that perfectly traverse the inboard middle land portion 10 and extend in a straight shape. The inboard middle sipes 25 may be useful to open the middle lateral lug grooves 24 more widely so as to form a large snow column therein.

Although not particularly limited, depths of the inboard middle sipes 25 are in a range of from 65% to 75% of a depth of main grooves.

The inboard middle sipes 25 are inclined in the same direction as the middle lateral lug grooves 24. Thus, longitudinal rigidity of the inboard middle land portion 10 between the middle lateral lug grooves 24 and the inboard middle sipes 25 are maintained in the axial direction in good balance, and thus the steering stability can improve.

The inboard middle sipes 25 include a first sipe 25A connecting one of the middle lateral lug grooves 24 with the second main groove 4, and a second sipe 25B connecting the third main groove 5 with the second main groove 4.

The first sipe 25A, in this embodiment, is arranged on an extension line in which a groove centerline 24c of one of the middle lateral lug grooves 24 is smoothly extended. The first sipe 25A can open the middle lateral lug grooves 24 more widely to form a large snow column to improve the on-snow performance.

The second sipes 25B are connected smoothly to the second edge portions 5b. Accordingly, since the stress concentration at each internal corner 10a between the first edge portion 5a and the second edge portion 5b is relaxed, high rigidity of the inboard middle land portion 10 can be ensured. In this embodiment, each second sipe 25B is connected to each second edge portion 5b so as to form a single straight line with each other.

An outboard land portion receives a larger cornering force than an inboard land portion when cornering. Thus, the steering stability improves by setting the maximum axial width Wb of the inboard middle land portion 10 being smaller than the maximum axial width Wa (illustrated in FIG. 4) of the outboard middle land portion 8 in order to balance the rigidity between the outboard and inboard land portions. When the maximum width Wa of the outboard middle land portion 8 is less than 1.5 times of the maximum width Wa of the inboard middle land portion 10, or the maximum width Wa of the outboard middle land portion 8 is more than 4.5 times of the maximum width Wb of the inboard middle land portion 10, the steering stability may be deteriorated due to deteriorated rigidity balance between the outboard middle land portion 8 and the inboard middle land portion 10. Thus, the maximum width Wa of the outboard middle land portion 8 is preferably in a range of from 1.5 to 4.5 times of the maximum width Wb of the inboard middle land portion 10.

As illustrated in FIG. 1, the inboard shoulder land portion 11 is disposed between the third main groove 5 and the inboard tread edge Ti. The inboard shoulder land portion 11I is provided with a plurality of axially extending inboard shoulder lug grooves 26 and a circumferentially and continuously extending inboard shoulder longitudinal groove 27.

The inboard shoulder lug grooves 26 according to the embodiment extend axially inwardly from the inboard tread edge Ti to the inboard shoulder longitudinal groove 27. Furthermore, the inboard shoulder lug grooves 26 include a first inboard portion 26A disposed axially inwardly and a second inboard portion 26B disposed axially inward of the first inboard portion 26A. The second inboard portion 26B has a groove width greater than a groove width of the first inboard portion 26A. The inboard shoulder lug grooves 26 may smoothly discharge snow through the outboard tread edge To.

Although not particularly limited, the axial maximum widths We and Wd of the inboard shoulder land portion 11 and the outboard shoulder land portion 9 respectively, which receive a large lateral force, are preferably in a range of from 10% to 30% of the tread width TW. Furthermore, the maximum width We of the inboard shoulder land portion 11 is preferably in a range of from 0.9 to 1.1 times of the maximum width Wd of the outboard shoulder land portion 9.

While pneumatic tire in accordance with the present invention have been described in detail, the present invention is not limited to the illustrated embodiments, but can be modified and carried out in various aspects.

EXAMPLE

Example A

Figure 6:
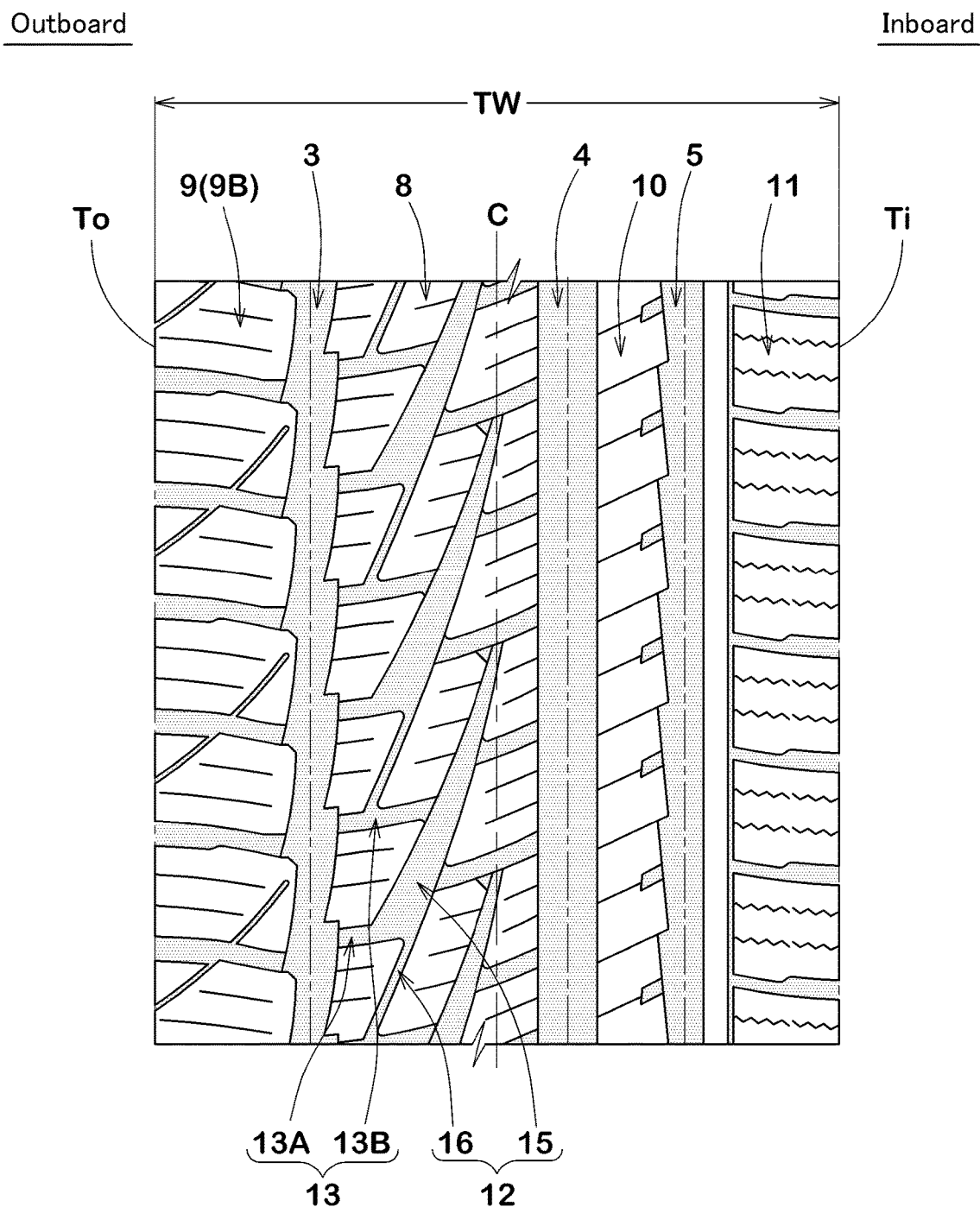
FIG. 6 is a development view of a tread portion in accordance with another embodiment of the present invention.
Figure 7:
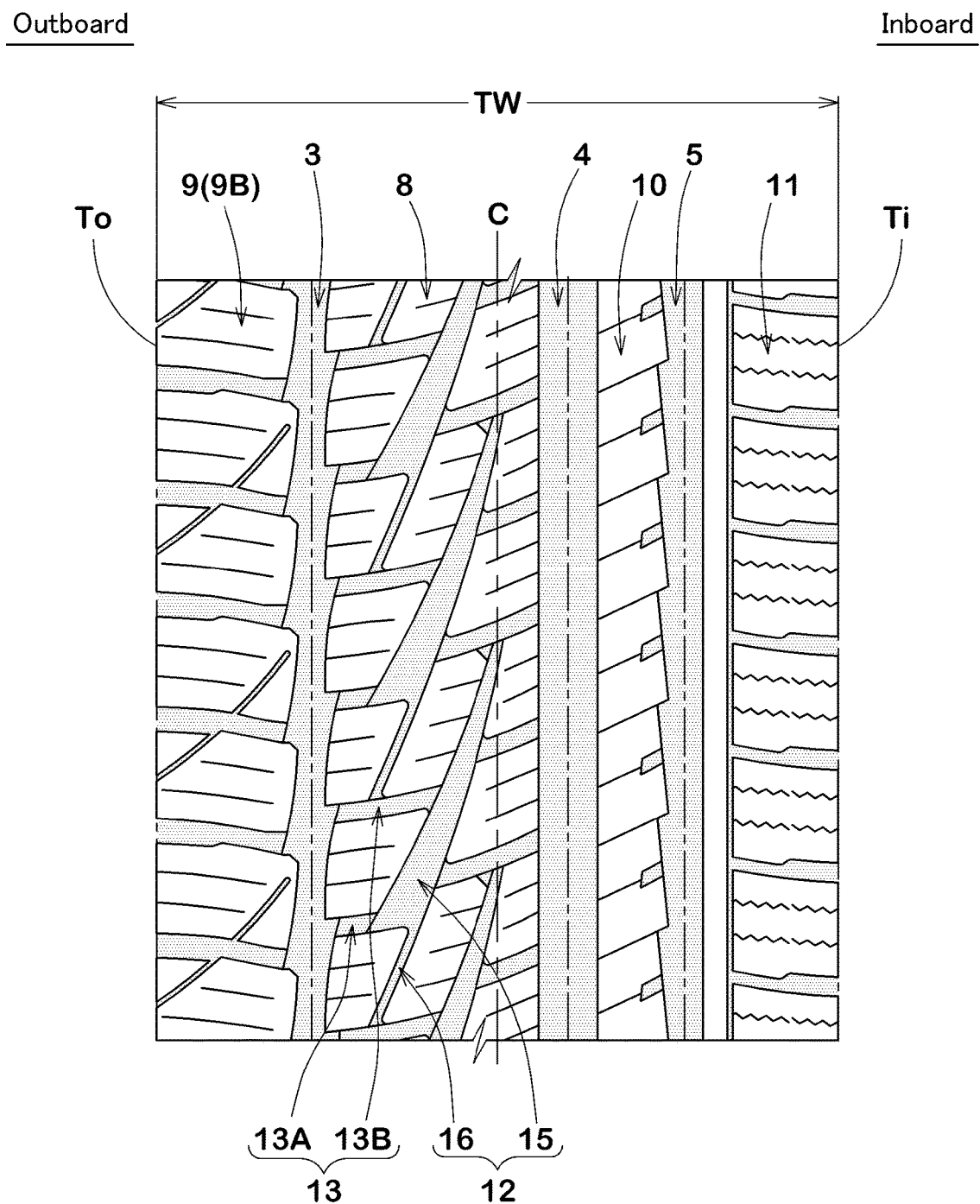
FIG. 7 is a development view of a tread portion in accordance with yet another embodiment of the present invention.
Figure 8:
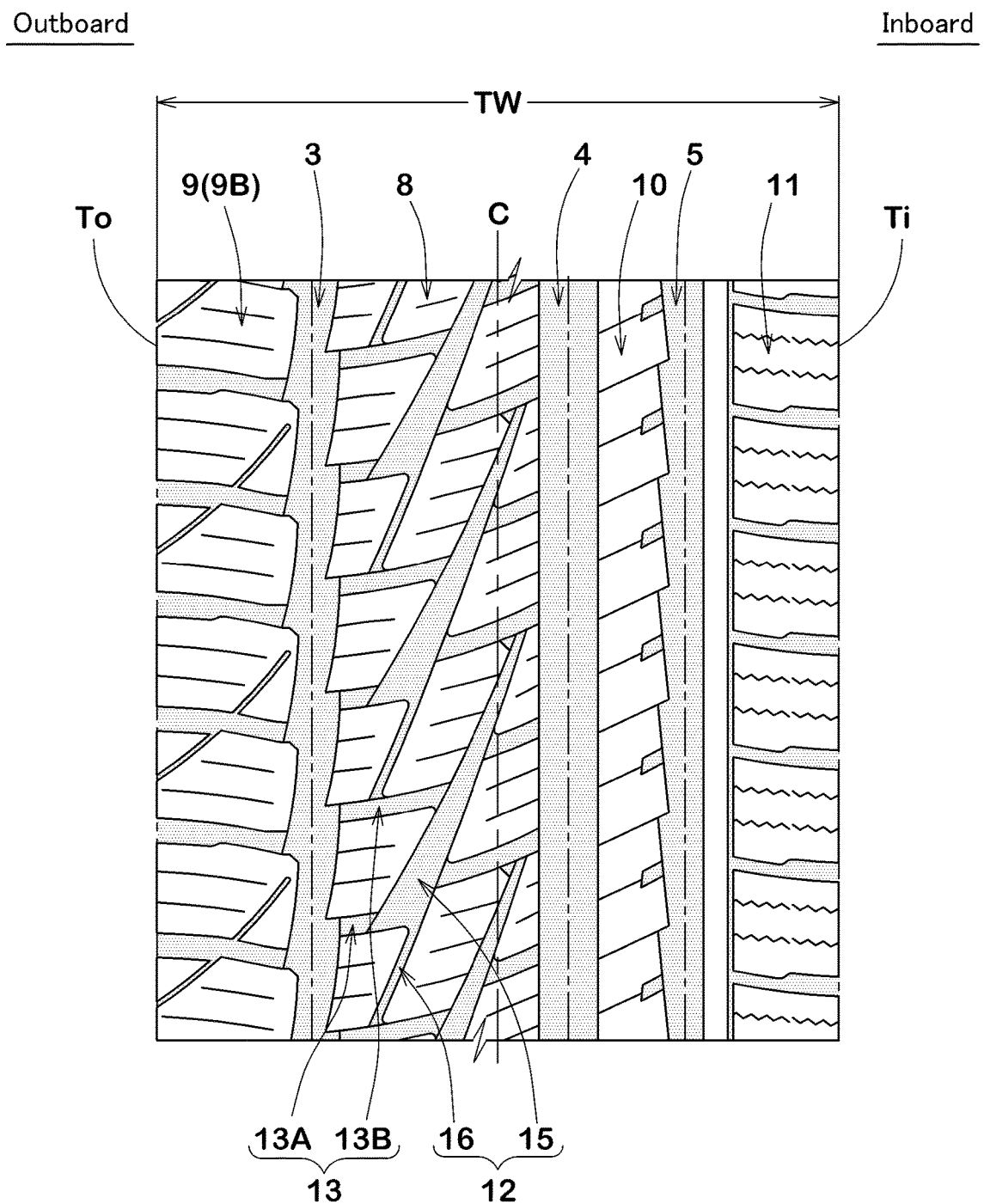
FIG. 8 is a development view of a tread portion in accordance with yet another embodiment of the present invention.
Figure 9:
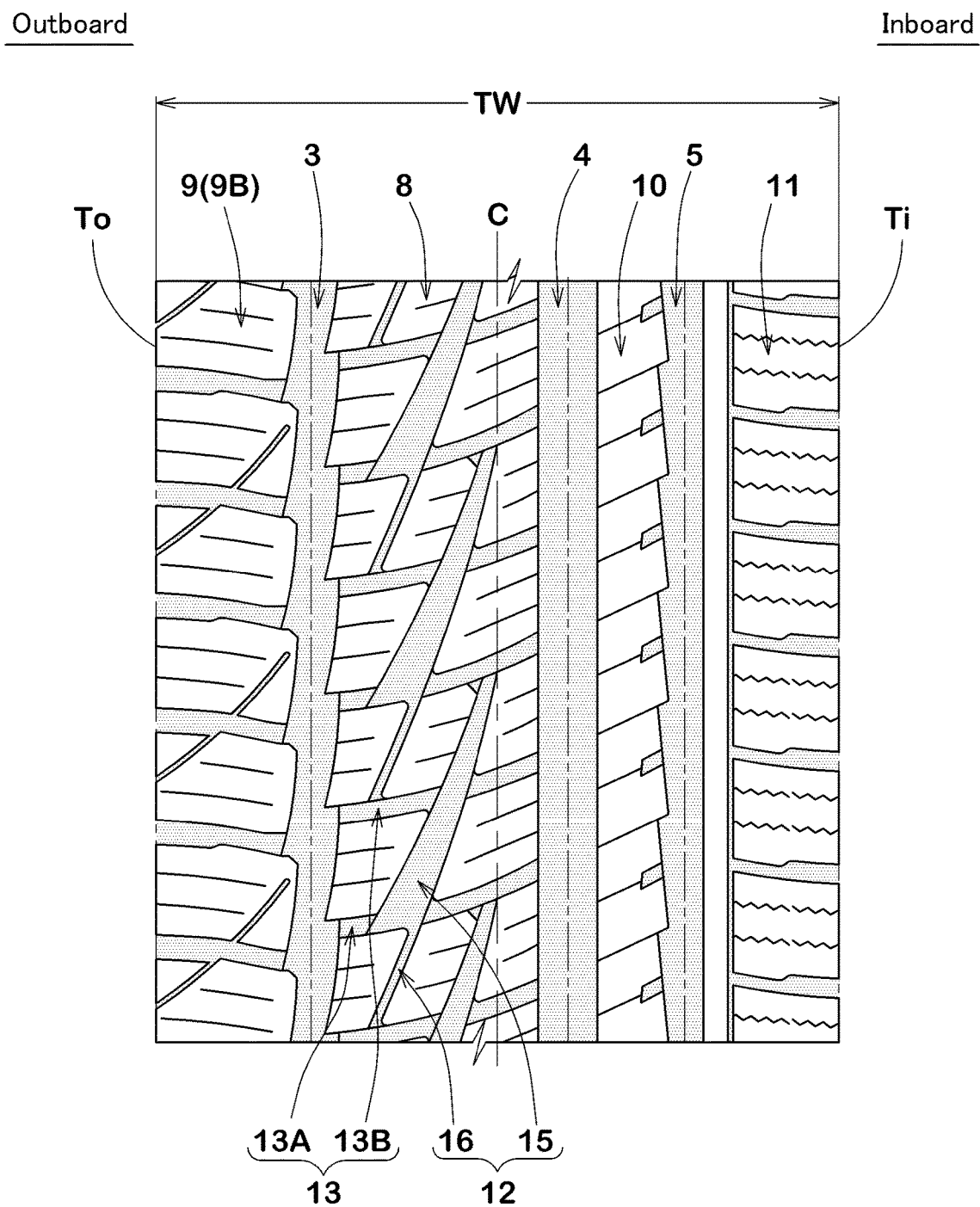
FIG. 9 is a development view of the tread portion of Comparative Example 1 of Table 1.

Pneumatic tires of 215/60R16 having a basic tread pattern illustrated in FIG. 1 or patterns illustrated in FIGS. 6 to 9 were manufactured based on details shown in Table 1, and then on-snow performance and steering stability of these tires was tested. The common specifications of tires are as follows. Note that FIG. 6 illustrates a tread pattern of Ex. 6 where the second inclined elements and groove edges of the outboard middle lug grooves are not smoothly connected. FIG. 7 illustrates a tread pattern of Ex. 7 where the first inclined elements are smooth arc shapes that convex toward the outboard. FIG. 8 illustrates a tread pattern of Ex. 8 where the inner ends of the first middle inclined elements are not provided on the tire equator. FIG. 9 illustrates a tread pattern of Ref. 1 where the outboard middle lug grooves and the inboard middle lug grooves are overlapped with each other in the circumferential direction of the tire.

Tread width TW: 166 mm
Groove depths of first middle inclined elements: 13 mm
Groove depths of second middle inclined elements: 14 mm
Groove depths of outboard middle lug grooves: 8 mm
Groove depths of inboard middle lug grooves: 9 mm
The test procedures are as follows:
On-Snow Performance:

Each test tire was mounted on a passenger car with a displacement of 2,400 cc as all the wheels under the following conditions. Then, a test driver drove the vehicle on a compacted snow road of a test course, and evaluated the traveling characteristic relating to steering stability such as handle stability, rigidity feeling, traction and grip by his feeling. The results are indicated in scores based on Ref. 1 being 100. The larger the value, the better the performance is.

Rim (all-wheel): 16×6.5 JJ
Internal pressure (all-wheel): 230 kPa
Steering Stability:

The test driver drove the test vehicle on a dry asphalt road of a test course, and then evaluated traveling characteristic such as steering response on cornering and rigidity feeling by his feeling. The results are indicated in scores based on Ref. 1 being 100. The larger the value, the better the performance is. The test result are shown in Table 1.

TABLE 1

| | Ex. 1 | Ref. 1 | Ex 2 | Ex. 3 | Ex. 4 | Ex 5 | Ex 6 | Ex. 7 | Ex. 8 |
|---|---|---|---|---|---|---|---|---|---|
| Figure illustrating tread portion | FIG. 1 | FIG. 9 | FIG. 1 | FIG. 1 | FIG. 1 | FIG. 1 | FIG. 6 | FIG. 7 | FIG. 8 |
| First portion groove width W1a/W1b (%) | 70 | 70 | 55 | 60 | 80 | 85 | 70 | 70 | 70 |
| On-snow performance [Score] | 110 | 100 | 100 | 105 | 113 | 115 | 108 | 105 | 111 |
| Steering stability [Score] | 115 | 100 | 120 | 118 | 110 | 105 | 110 | 117 | 112 |

W1b: Second portion groove width

From the test results, it is confirmed that the example tires improve on-snow performance and steering stability in good balance as compared with the reference. Although another test was conducted using tires having a different tire size, the result was also the same as this test.

Example B

Pneumatic tires of 215/60R16 having a basic tread pattern illustrated in FIG. 1 were manufactured based on details shown in Table 2, and then on-snow performance and steering stability of these tires was tested. The common specifications of tires are as follows.

Tread width TW: 166 mm
Average groove width W4 of first middle inclined element: 7 mm
Maximum groove width W4$b$ of first middle inclined element: 11 mm
Minimum groove width W4$a$ of first middle inclined element: 3 mm
The test procedures are as follows:
On-Snow Performance:

Each test tire was mounted on a passenger car with a displacement of 2,400 cc as all the wheels under the following conditions. Then, a test driver drove the vehicle on a compacted snow road of a test course, and evaluated the traveling characteristic relating to steering stability such as handle stability, rigidity feeling, traction and grip by his feeling. The results are indicated in scores based on Ref. 1 being 100. The larger the value, the better the performance is.

Rim (all-wheel): 16×6.5 JJ
Internal pressure (all-wheel): 230 kPa
Steering Stability:

The test driver drove the test vehicle on a dry asphalt road of a test course, and then evaluated traveling characteristic such as steering response on cornering and rigidity feeling by his feeling. The results are indicated in scores based on Ref. 1 being 100. The larger the value, the better the performance is. The test result are shown in Table 2.

TABLE 2

Figure 10:
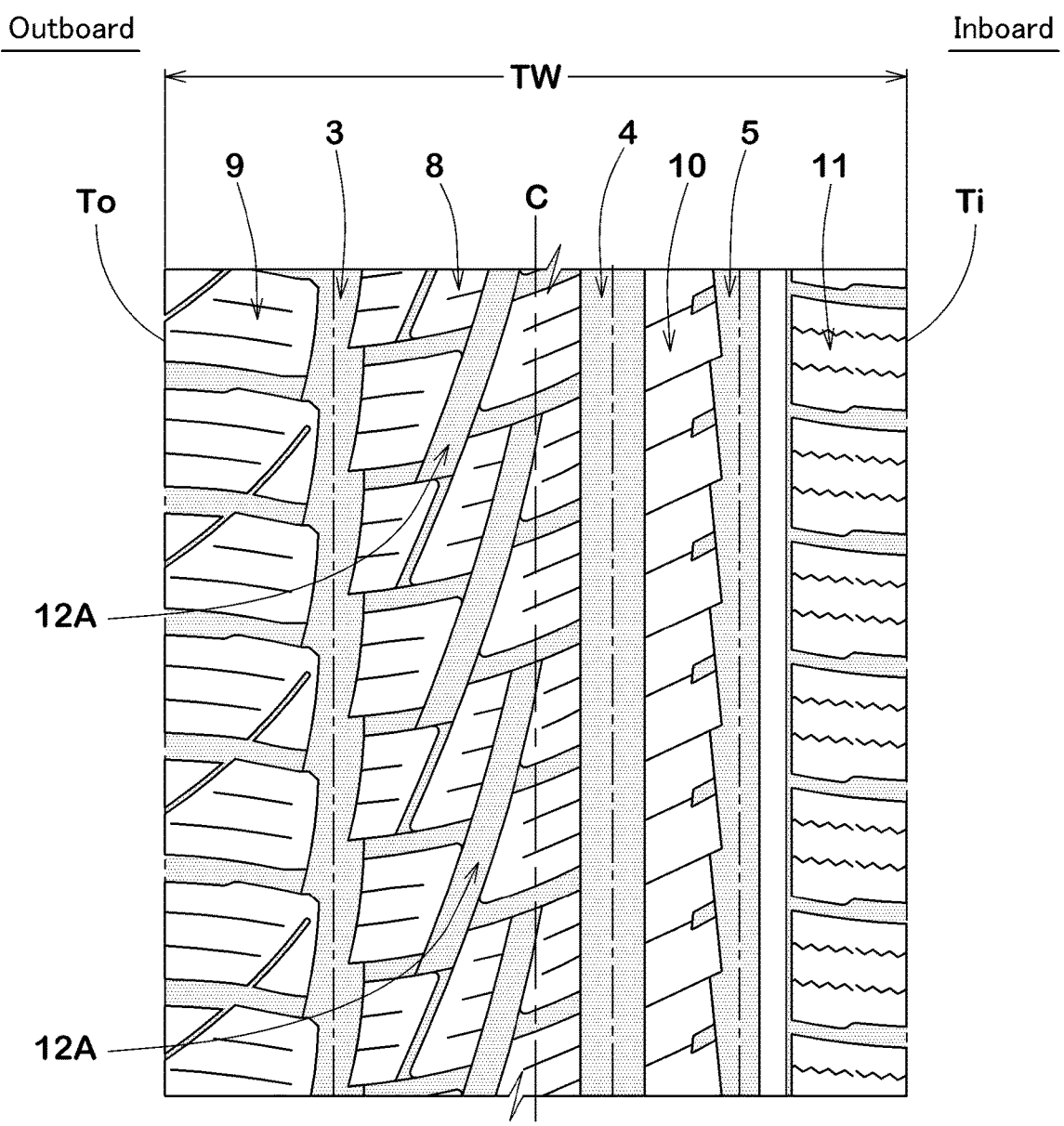
FIG. 10 is a development view of a tread portion in accordance with yet another embodiment of the present invention.
Figure 11:
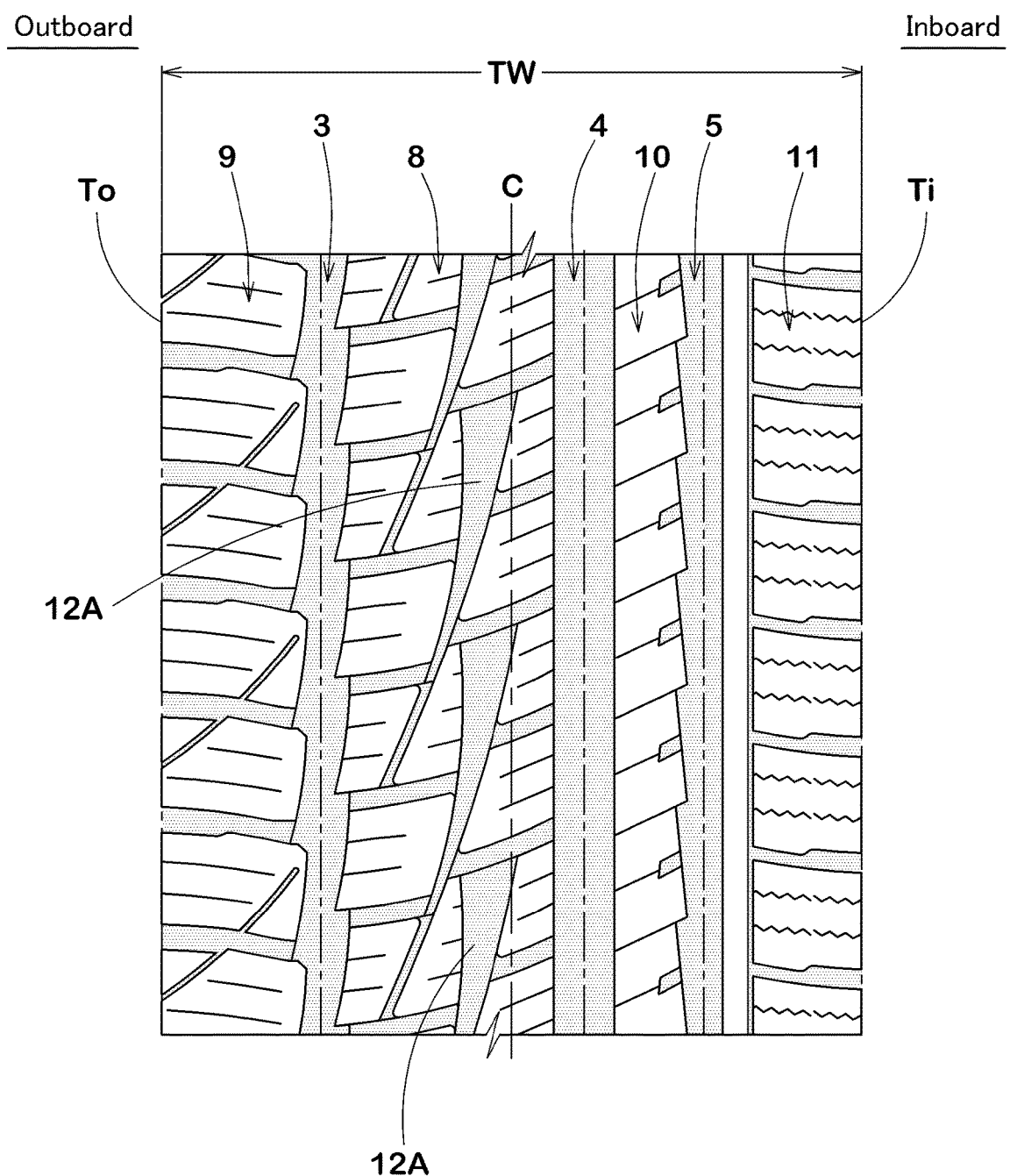
FIG. 11 is a development view of a tread portion in accordance with yet another embodiment of the present invention.
Figure 12:
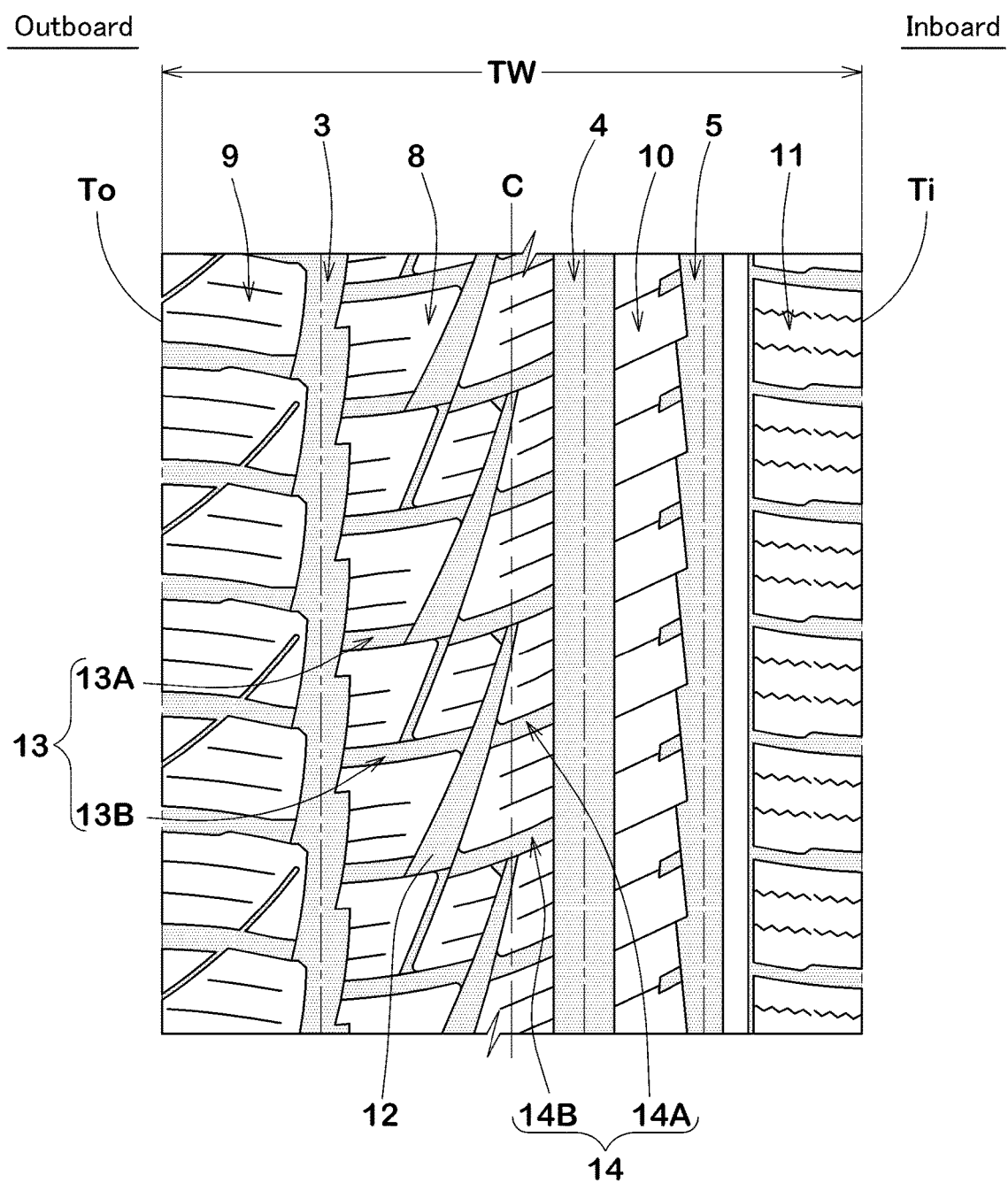
FIG. 12 is a development view of the tread portion of Comparative Example 1 of Table 2.

| | Ex. 1 | Ex. 2 | Ex. 3 | Ref. 1 |
|---|---|---|---|---|
| Figure illustrating tread portion | FIG. 1 | FIG. 10 | FIG. 11 | FIG. 12 |
| On-snow performance [Score] | 105 | 103 | 102 | 100 |
| Steering stability [Score] | 105 | 103 | 102 | 100 |

From the test results, it is confirmed that the example tires improve on-snow performance and steering stability in good balance as compared with the reference. Although another test was conducted using tires having a different tire size, the result was also the same as this test.

Example C

Figure 13:
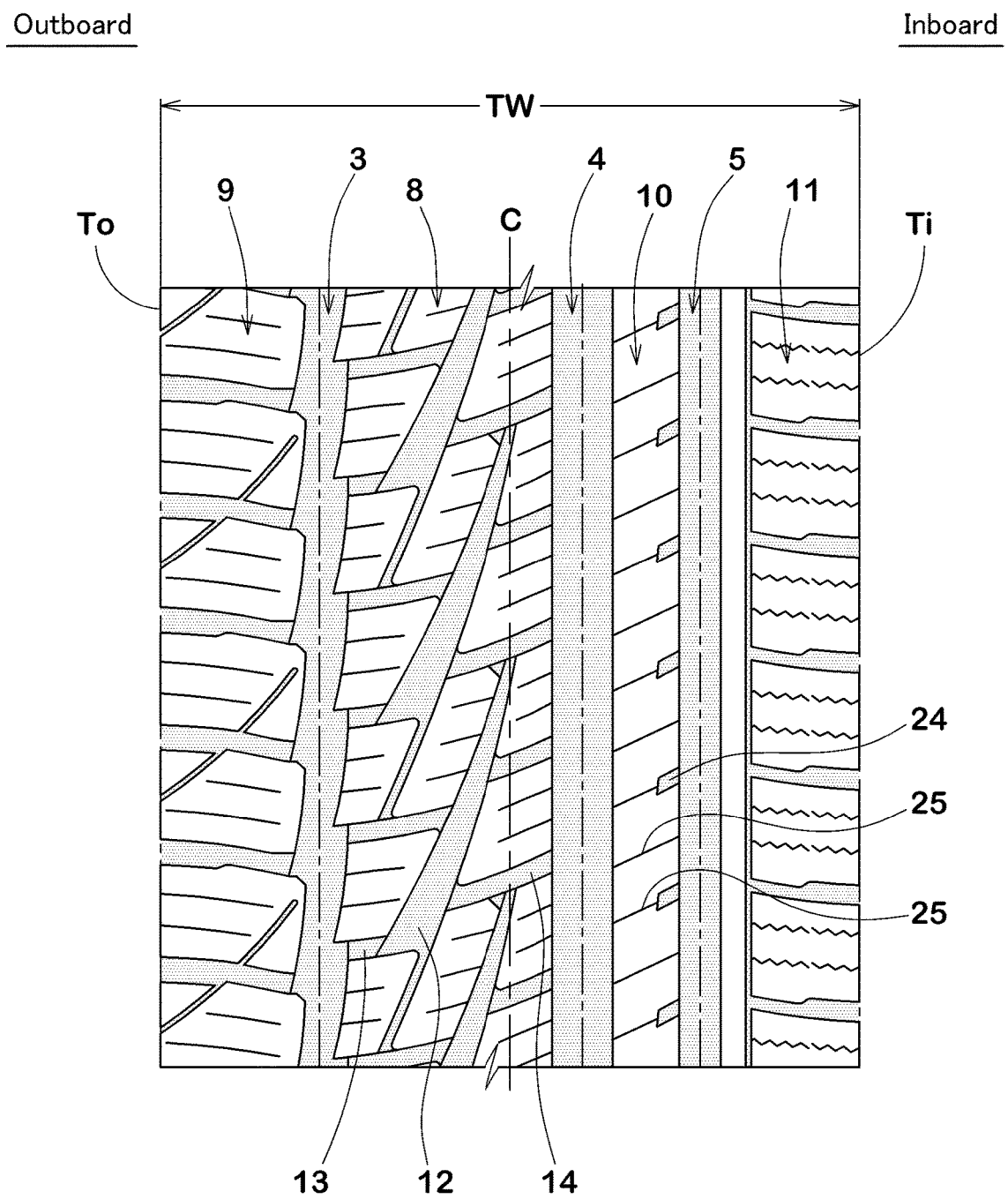
FIG. 13 is a development view of a tread portion in accordance with yet another embodiment of the present invention.
Figure 14:
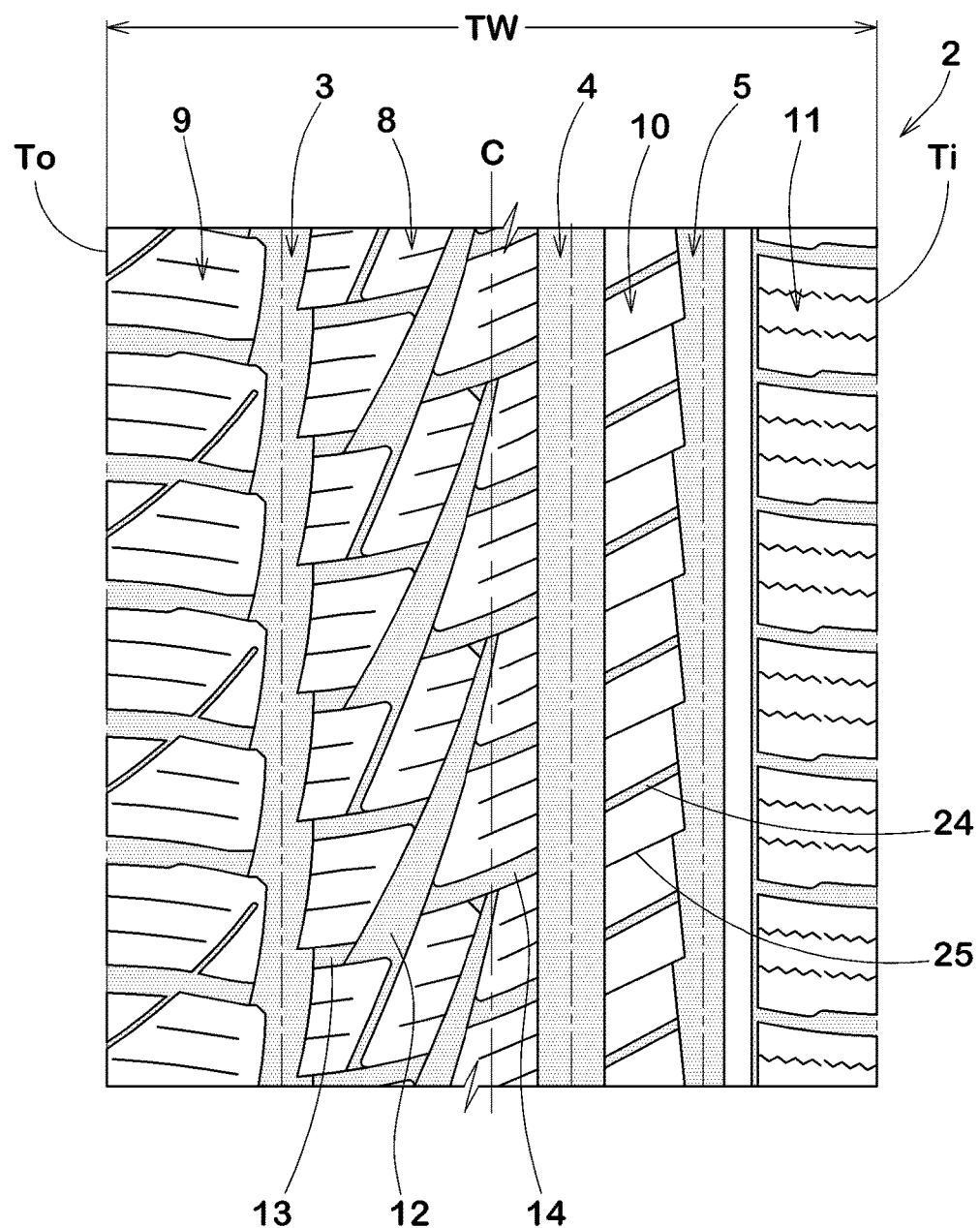
FIG. 14 is a development view of a tread portion in accordance with yet another embodiment of the present invention.

Pneumatic tires of 215/60R16 having a basic tread pattern illustrated in FIG. 1 were manufactured based on details shown in Table 3, and were tested. The common specifications of tires are as follows. The common specifications of tires are as follows. Note that total groove areas of the tread portions illustrated in FIGS. 1, 13 and 14 are the same. Furthermore, the Ref. 1 has the read pattern illustrated in FIG. 1 where the middle inclined grooves extend smoothly toward the inboard and communicate with the first main groove, and no inboard middle lug grooves are provided.

Tread width TW: 166 mm
Groove depths of first middle inclined elements: 8.2 mm
Groove depths of second middle inclined elements: 5.4 mm
Groove depths of outboard middle lug grooves: 5.8 mm
Groove depths of inboard middle lug grooves: 4.0 mm
groove depths of middle lateral lug grooves: 6.3 mm
groove depths of inboard middle sipes: 4.0 mm On-Snow Performance:

Each test tire was mounted on a passenger car with a displacement of 2,400 cc as all the wheels under the following conditions. Then, a test driver drove the vehicle on a compacted snow road of a test course, and evaluated the traveling characteristic relating to steering stability such as handle stability, rigidity feeling, traction and grip by his feeling. The results are indicated in scores based on Ref. 1 being 100. The larger the value, the better the performance is.

Rim (all-wheel): 16×6.5 JJ
Internal pressure (all-wheel): 230 kPa

Steering Stability:

The test driver drove the test vehicle on a dry asphalt road of a test course, and then evaluated traveling characteristic such as steering response on cornering and rigidity feeling by his feeling. The results are indicated in scores based on Ref. 1 being 100. The larger the value, the better the performance is. The test result are shown in Table 3.

TABLE 3

|  | Ref. 1 | Ex. 1 | Ex. 2 | Ex. 3 | Ex. 4 | Ex. 5 | Ex. 6 | Ex. 7 |
|---|---|---|---|---|---|---|---|---|
| Figure illustrating tread portion | FIG. 1 | FIG. 1 | FIG. 1 | FIG. 1 | FIG. 1 | FIG. 1 | FIG. 13 | FIG. 14 |
| Maximum width of outboard middle land portion/maximum width of inboard middle land portion (*1) (times) | 3.0 | 3.0 | 1.2 | 1.5 | 4.5 | 4.7 | 3.0 | 3.0 |
| On-snow performance [Score] | 100 | 120 | 116 | 118 | 118 | 117 | 118 | 122 |
| Steering stability [Score] | 100 | 100 | 96 | 98 | 98 | 96 | 101 | 97 |

(*1) Wa/Wb

From the test results, it is confirmed that the example tires improve on-snow performance and steering stability in good balance as compared with the reference. Although another test was conducted using tires having a different tire size or tires having groove widths modified within a preferred range, the result was also the same as this test.

REFERENCE SIGNS LIST

3 First main groove
4 Second main groove
8 Outboard middle land portion
6 First portion
7 Second portion
12 Middle inclined grooves
13 Outboard middle lug grooves
14 Inboard middle lug grooves

The invention claimed is:

1. A pneumatic tire comprising:
a tread portion comprising a designated mounting orientation on a vehicle, an outboard tread edge located on an outboard of the vehicle when the tire is mounted on the vehicle and an inboard tread edge located on an inboard of the vehicle when the tire is mounted on the vehicle;
the tread portion being provided with a circumferentially and continuously extending first main groove nearest to the outboard tread edge and a circumferentially and continuously extending second main groove adjacent to the first main groove on the side of the inboard tread edge to form an outboard middle land portion between the first main groove and the second main groove;
the first main groove comprising first portions and second portions having a groove width greater than that of the first portions alternately in a circumferential direction of the tire;
the outboard middle land portion being provided with a plurality of middle inclined grooves that is not directly communicated with neither the first main groove nor the second main groove, a plurality of outboard middle lug grooves connecting the second portions of the first main groove to the middle inclined grooves and inboard middle lug grooves connecting the middle inclined grooves to the second main grooves; and
the outboard middle lug grooves being arranged at different locations to the inboard middle lug grooves with respect to a circumferential direction of the tire such that the inboard middle lug grooves do not overlap with any outboard middle lug grooves in the axial direction of the tire.

2. The pneumatic tire according to claim 1,
wherein the groove width of the first portions in an axial direction of the tire is in a range of from 60% to 80% of the groove width of the second portions in the axial direction of the tire.

3. The pneumatic tire according to claim 1,
wherein the first inclined elements have an arc shape that is convex toward the tire equator.

4. The pneumatic tire according to claim 1,
wherein each middle inclined groove comprises:

a first middle inclined element extending from an inner end on the side of the inboard tread edge to an outer end on the side of the outboard tread edge while increasing a groove width toward the outer end; and a second middle inclined element connecting the outer end of the first middle inclined element to one of the outboard middle lug grooves and having a groove width smaller than that of the first middle inclined element.

5. The pneumatic tire according to claim 4, wherein the inner end of the first middle inclined element is located on the tire equator.

6. The pneumatic tire according to claim 4, wherein the outboard middle lug grooves comprise a first outboard middle lug groove and a second outboard middle lug groove having an axial length larger than that of the first outboard middle lug groove alternately in the circumferential direction of the tire, and each first middle inclined element is inclined toward the second main groove so as to extend from an inner end of one of the first outboard middle lug groove toward one side in the circumferential direction through an inner end of one of the second outboard middle lug groove which is adjacent to the first outboard middle lug groove.

7. The pneumatic tire according to claim 6, wherein the second middle inclined element extends to the other side in the circumferential direction of the tire from the first middle inclined element toward the first main groove so as to communicate with one of the second outboard middle lug grooves.

8. The pneumatic tire according to claim 4, wherein a maximum groove width of the first middle inclined element is greater than a groove width of the outboard middle lug grooves.

9. The pneumatic tire according to claim 6, wherein the second outboard middle lug groove is in communication with a middle portion of one of the first middle inclined elements.

10. The pneumatic tire according to claim 4, wherein the first middle inclined elements are inclined at an angle of from 10 to 30 degrees with respect to the circumferential direction of the tire.

11. The pneumatic tire according to claim 4, wherein the inboard middle lug grooves comprise a first inboard middle lug groove and a second inboard middle lug groove having an axial length larger than that of the first inboard middle lug groove alternately in the circumferential direction of the tire, and outer ends of the first inboard middle lug groove and the second inboard middle lug groove are in communicate with one of the first middle inclined elements.

12. The pneumatic tire according to claim 11, wherein the outer ends of the first inboard middle lug groove and the second inboard middle lug groove are in communication with one of the first middle inclined elements at different locations with respect to the inner end of the second outboard middle lug groove in the circumferential direction of the tire.

13. The pneumatic tire according to claim 1, wherein the tread portion is further provided with a circumferentially and continuously extending a third main groove nearest to the inboard tread edge to form an inboard middle land portion between the second main groove and the third main groove, and the inboard middle land portion is configured as a rib that is not provided with any lateral grooves connecting the second main groove and the third main groove.

14. The pneumatic tire according to claim 13, wherein the third main groove comprises a straightly and circumferentially extending inboard groove edge on the side of the inboard tread edge.

15. The pneumatic tire according to claim 13, wherein the third main groove comprises a zigzag outboard groove edge on the side of the outboard tread edge.

16. The pneumatic tire according to claim 13, wherein the inboard middle land portion is provided with an inboard middle sipe traversing the inboard middle land portion.

17. The pneumatic tire according to claim 16, wherein the inboard middle land portion is provided with a plurality of middle lateral lug grooves extending axially inwardly from the third main groove and terminating within the inboard middle land portion, and the inboard middle sipe comprises a first sipe connecting one of the middle lateral lug grooves to the second main groove and a second sipe connecting the third main groove to the second main groove.

18. The pneumatic tire according to claim 17, wherein the inboard middle sipe is inclined in the same direction as the middle lateral lug grooves.

19. The pneumatic tire according to claim 17, wherein the third main groove comprises a zigzag outboard groove edge on the side of the outboard tread edge, the outboard groove edge comprises a first edge portion inclined in a first direction with respect to the circumferential direction of the tire and a second edge portion inclined in an opposite direction to the first edge portion and having a circumferential length smaller than that of the first edge portion alternately in the circumferential direction of the tire, and the second sipe is connected to the second edge portion smoothly.

20. A pneumatic tire comprising:
a tread portion comprising a designated mounting orientation on a vehicle, an outboard tread edge located on an outboard of the vehicle when the tire is mounted on the vehicle and an inboard tread edge located on an inboard of the vehicle when the tire is mounted on the vehicle;
the tread portion being provided with
a circumferentially and continuously extending first main groove nearest to the outboard tread edge to form an outboard shoulder land portion between the outboard tread edge and the first main groove,
a circumferentially and continuously extending second main groove adjacent to the first main groove on the side of the inboard tread edge to form an outboard middle land portion between the first main groove and the second main groove, and
a circumferentially and continuously extending a third main groove nearest to the inboard tread edge to form an inboard middle land portion between the second main groove and the third main groove, and
an inboard shoulder land portion between the third main groove and the inboard tread edge;
the first main groove comprising first portions and second portions having a groove width greater than that of the first portions alternately in a circumferential direction of the tire;
the outboard middle land portion being provided with a plurality of middle inclined grooves that is not directly communicated with neither the first main groove nor the second main groove, a plurality of outboard middle lug grooves connecting the second portions of the first main groove to the middle inclined grooves and inboard middle lug grooves connecting the middle inclined grooves to the second main grooves;

the outboard middle lug grooves being arranged at different locations to the inboard middle lug grooves with respect to a circumferential direction of the tire;

the inboard middle land portion configured as a rib that is not provided with any lateral grooves connecting the second main groove and the third main groove;

the outboard shoulder land portion being formed as a block row which comprises a plurality of circumferentially arranged outboard shoulder blocks; and the inboard shoulder land portion comprising a block row which comprises a plurality of circumferentially arranged inboard shoulder blocks.

* * * * *